US011847376B2

(12) United States Patent
Yliaho et al.

(10) Patent No.: US 11,847,376 B2
(45) Date of Patent: *Dec. 19, 2023

(54) ORIENTATION BASED MICROPHONE SELECTION APPARATUS

(71) Applicant: NOKIA TECHNOLOGIES OY, Espoo (FI)

(72) Inventors: Marko Tapani Yliaho, Tampere (FI); Ari Juhani Koski, Lempaala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,359

(22) Filed: Oct. 29, 2021

(65) Prior Publication Data

US 2022/0129233 A1 Apr. 28, 2022

Related U.S. Application Data

(63) Continuation of application No. 16/833,453, filed on Mar. 27, 2020, now Pat. No. 11,216,239, which is a (Continued)

(51) Int. Cl.
*G06F 3/16* (2006.01)
*H04M 1/72454* (2021.01)
(Continued)

(52) U.S. Cl.
CPC .......... *G06F 3/16* (2013.01); *H04M 1/72454* (2021.01); *H04R 3/005* (2013.01);
(Continued)

(58) Field of Classification Search
CPC .......... H04R 3/005; G10L 2021/02166; H04S 2400/15
(Continued)

(56) References Cited

U.S. PATENT DOCUMENTS 8,041,043 B2 10/2011 Faller et al.
8,295,959 B2 10/2012 Wakabayashi
(Continued)

FOREIGN PATENT DOCUMENTS

JP 2006033615 A 2/2006
JP 2006135503 A 5/2006
(Continued)

OTHER PUBLICATIONS

Liu et al., "Energy-Based Sound Source Localization and Gain Normalization for Ad Hoc Microphone Arrays", 2007 IEEE International Conference on Acoustics, Speech and Signal Processing, (Apr. 15-20, 2007), 4 pages.
(Continued)

*Primary Examiner* — Alexander Krzystan
(74) *Attorney, Agent, or Firm* — ALSTON & BIRD LLP

(57) ABSTRACT

An apparatus comprising: an input configured to receive at least one audio signal input from at least one microphone; at least one microphone configuration determiner configured to provide for the at least one microphone a location on the apparatus; at least one sensor configured to provide at least one orientation of the apparatus; a recording mode determiner configured to determine at least one recording mode for the apparatus based on the location of the at least one microphone and the at least one orientation of the apparatus; a recording mode controller configured to determine at least one recording parameter for the at least one audio signal input from the at least one microphone based in the at feast one recording mode; and digital signal processor configured to apply the at least one recording parameter to the at least one audio signal input.

37 Claims, 24 Drawing Sheets

Related U.S. Application Data continuation of application No. 14/443,791, filed as application No. PCT/IB2012/056991 on Dec. 5, 2012, now Pat. No. 10,606,546.

(51) Int. Cl.

| | |
|---|---|
| *H04R 3/00* | (2006.01) |
| *G11B 20/00* | (2006.01) |
| *H04M 1/60* | (2006.01) |
| *H04M 1/656* | (2006.01) |
| *H04M 1/72457* | (2021.01) |

(52) U.S. Cl.
CPC ..... *G11B 20/00992* (2013.01); *H04M 1/6008* (2013.01); *H04M 1/656* (2013.01); *H04M 1/72457* (2021.01); *H04S 2400/15* (2013.01)

(58) Field of Classification Search
USPC .......................................... 381/122, 92, 356
See application file for complete search history.

(56) References Cited

U.S. PATENT DOCUMENTS

| | | | |
|---|---|---|---|
| 8,411,880 B2 | 4/2013 | Wang et al. | |
| 8,842,848 B2 | 9/2014 | Donaldson et al. | |
| 8,897,455 B2 | 11/2014 | Visser et al. | |
| 9,161,149 B2 | 10/2015 | Visser et al. | |
| 9,955,263 B2* | 4/2018 | Huttunen | H04R 3/005 |
| 10,606,546 B2 | 3/2020 | Yliaho et al. | |
| 2006/0067547 A1 | 3/2006 | Le et al. | |
| 2006/0222187 A1 | 10/2006 | Jarrett et al. | |
| 2007/0291954 A1 | 12/2007 | Neu et al. | |
| 2008/0165989 A1 | 7/2008 | Seii et al. | |
| 2010/0069115 A1 | 3/2010 | Liu | |
| 2010/0081487 A1 | 4/2010 | Chen et al. | |
| 2010/0100209 A1 | 4/2010 | Wakabayashi | |
| 2012/0128160 A1 | 5/2012 | Kim et al. | |
| 2012/0128175 A1* | 5/2012 | Visser | H04R 3/005 381/92 |
| 2013/0275873 A1* | 10/2013 | Shaw | H04R 1/08 715/716 |
| 2017/0094440 A1* | 3/2017 | Brown | H04S 7/30 |
| 2017/0272878 A1 | 9/2017 | Partio et al. | |

FOREIGN PATENT DOCUMENTS

| | | |
|---|---|---|
| JP | 2007235943 A | 9/2007 |
| JP | 2010272926 A | 12/2010 |
| JP | 2011091658 A | 5/2011 |
| WO | WO 2011/116839 A1 | 9/2011 |

OTHER PUBLICATIONS

Nakadai et al., "Real-Time Tracking of Multiple Sound Sources by Integration of In-Room and Robot-Embedded Microphone Arrays", 2006 IEEE/RSJ International Conference on Intelligent Robots and Systems, (Oct. 9-15, 2006), 8 pages.

International Search Report and Written Opinion from International Patent Application No. PCT/IB2012/056991, dated Oct. 14, 2013, 12 pages.

"Hear How Fostex AR-4i Solves iPhone's Recording Issues," Wired, 13 pages, (2012). [Retrieved from the Internet Oct. 17, 2019: <URL: https://www.wired.com/2012/03/iphone-fostex-ar4i-review/>]. [Author Unknown].

Non-Final Office Action for U.S. Appl. No. 14/443,791 dated Aug. 26, 2016, 13 pages, U.S.

Final Office Action for U.S. Appl. No. 14/443,791 dated Jan. 18, 2017, 15 pages, U.S.

Advisory Action for U.S. Appl. No. 14/443,791 dated Apr. 19, 2017, 4 pages, U.S.

Non-Final Office Action for U.S. Appl. No. 14/443,791 dated Jul. 21, 2017, 16 pages, U.S.

Final Office Action for U.S. Appl. No. 14/443,791 dated Mar. 7, 2018, 18 pages, U.S.

Office Action for U.S. Appl. No. 14/443,791 dated Dec. 13, 2018, 15 pages, U.S.

Notice of Allowance for U.S. Appl. No. 14/443,791 dated Jul. 26, 2019, 8 pages, U.S.

Notice of Allowance for U.S. Appl. No. 14/443,791 dated Nov. 19, 2019, 8 pages, U.S.

Non-Final Office Action for U.S. Appl. No. 16/833,453 dated May 26, 2021.

Notice of Allowance for U.S. Appl. No. 16/833,453 dated Sep. 13, 2021.

* cited by examiner

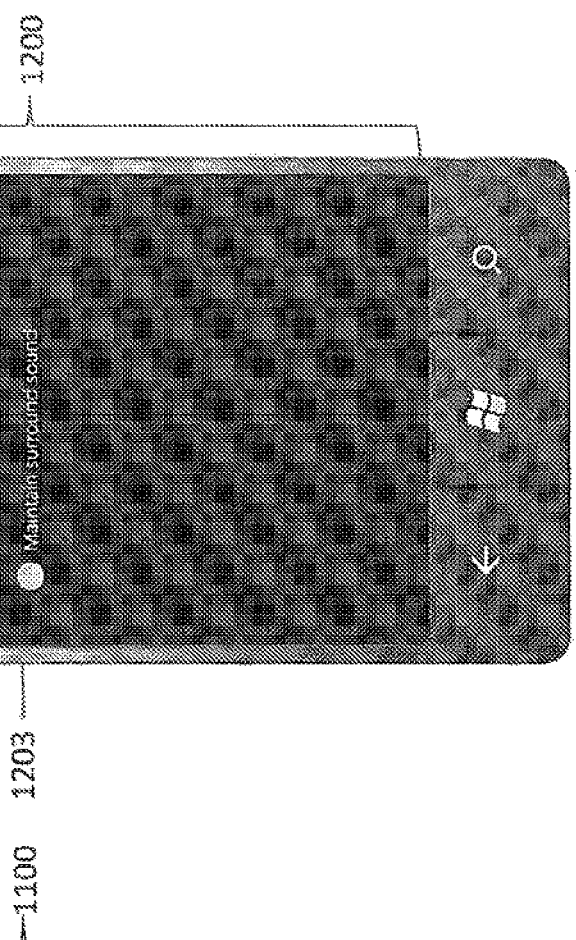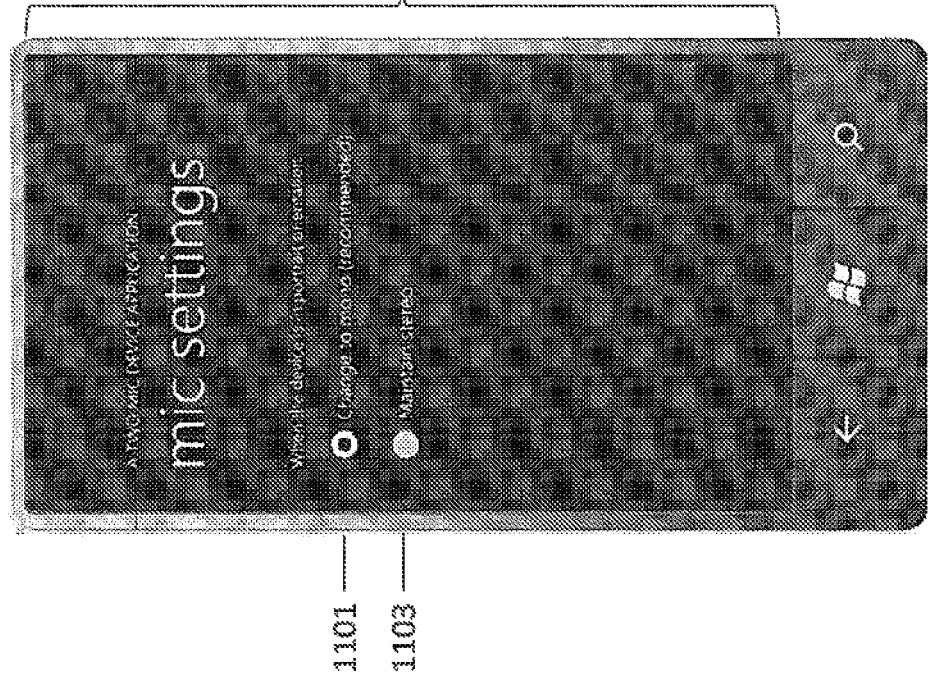

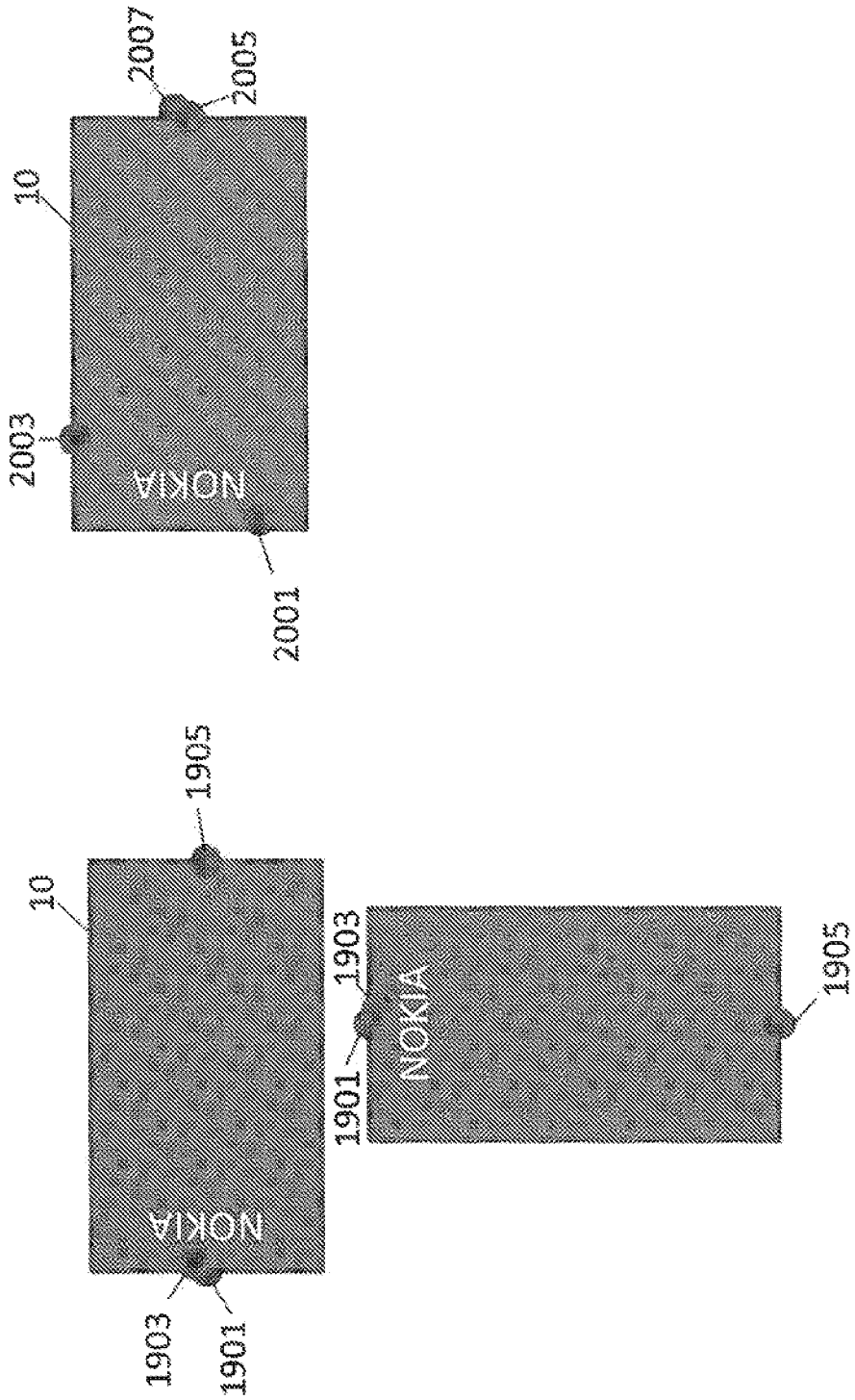

ORIENTATION BASED MICROPHONE SELECTION APPARATUS

CROSS-REFERENCE TO RELATED APPLICATIONS

This application is a continuation of U.S. patent application Ser. No. 16/833,453 filed Mar. 27, 2020, which is a continuation of U.S. patent application Ser. No. 14/443,791 filed May 19, 2015, which was originally filed as Patent Cooperation Treaty Application No. PCT/IB2012/056991 filed Dec. 5, 2012. The entire contents of all of these applications are incorporated herein by reference.

FIELD

The present application relates to apparatus and methods for audio signal recording and processing and specifically but not only audio signal recording and processing within mobile apparatus.

BACKGROUND

Audio recording systems can make use of more than one microphone to pick-up and record audio in the surrounding environment.

For example mobile devices or apparatus can be equipped with two or more microphones which offers a possibility to record multichannel audio, in other words to capture surround sound. The recording of 'real' surround sounds requires three or more microphones. However as well as the number of microphones the location or positioning of the microphones relative to each other and the surroundings is significant with regards to recording surround sound. For example a device with a fixed arrangement of microphones can be orientated in various directions, each of the orientations causing the device to have a distribution or arrangement of microphones which can limit the ability to record surround sound. For example the device can be located in landscape mode (in other words with a larger horizontal dimension) or portrait mode (with a larger vertical dimension) and the microphones thus effectively change position dependent on the orientation of the apparatus. The positioning of the microphones should be such that the plane defined by the microphone inlets should be as parallel as possible to the horizontal plane. For example some manufacturers use a threshold of within 45 degrees.

SUMMARY

According to a first aspect there is provided a method comprising: providing at least one audio signal input from at least one microphone; providing for the at least one microphone a location on an apparatus; providing at least one orientation of the apparatus; determining at least one recording mode for the apparatus based on the location of the at least one microphone and the at least one orientation of the apparatus; determining at least one recording parameter for the at least one audio signal input from the at least one microphone based on the at least one recording mode; and applying the at least one recording parameter to the at least one audio signal input.

The method may further comprise providing at least one user input, and wherein determining the recording mode for the apparatus further comprises determining the recording mode based on the at least one user input.

Determining at least one recording mode for the apparatus based on the location of the microphone and the at least one orientation of the apparatus may comprise: determining at least two recording modes for the apparatus based on the location of the microphone and the at least one orientation of the apparatus; presenting an indication for each of the at least two recording modes for the apparatus on a display; and selecting at least one of the two recording modes for the apparatus based on a user interface input related to the indication for each of the at least two recording modes for the apparatus on the display.

Presenting an indication for each of the at least two recording modes for the apparatus on a display may comprise: presenting a current recording mode indication and a recommended recording mode indication; and presenting a current recording mode indication, a second recording mode indication and a recommended recording mode indication.

Presenting a current recording mode indication and a recommended recording mode indication may comprise at least one of: presenting a maintain stereo recording mode indication as the current recording mode indication and a change to mono recording mode indication as the recommended recording mode indication; and presenting a maintain surround sound recording mode indication as the current recording mode indication and a change to stereo recording mode indication as the recommended recording mode indication, Presenting a current recording mode indication, a second recording mode indication and a recommended recording mode indication may comprise presenting a maintain surround sound recording mode indication as the current recording mode indication, a change to stereo recording mode indication as the second recording mode indication and a change to mono recording mode indication as the recommended recording mode indication.

Providing at least one audio signal input from at least one microphone may comprise providing at least two signal inputs from at least two microphones, and providing for the at least one microphone a location on an apparatus comprises providing for the at least two microphones locations on the apparatus.

Determining at least one recording parameter for the at least one audio signal input from the at least one microphone based on the at least one recording mode may comprise: selecting which of the at least one audio signal input from the at least one microphone to input; determining signal processing parameters for the at least one audio signal input from the at least one microphone to input; and determining mixing parameters for the at least one audio signal input from the at least one microphone to input.

Determining at least one recording mode for the apparatus based on the location of the microphone and the at least one orientation of the apparatus may comprise: determining a first recording mode for a first recording track for the apparatus based on the location of the microphone and the at least one orientation of the apparatus; and determining a second recording mode for a second recording track for the apparatus based on the location of the microphone and the at least one orientation of the apparatus.

Providing at least one orientation of the apparatus may comprise providing at least one orientation change of the apparatus and furthermore determining at least one recording mode for the apparatus based on the location of the microphone and the at least one orientation of the apparatus comprises determining at least one recording mode for the apparatus based on the location of the microphone and the at least one orientation change of the apparatus.

According to a second aspect there is provided an apparatus comprising; an input configured to receive at least one audio signal input from at least one microphone; at least one microphone configuration determiner configured to provide for the at least one microphone a location on the apparatus; at least one sensor configured to provide at least one orientation of the apparatus; a recording mode determiner configured to determine at least one recording mode for the apparatus based on the location of the at least one microphone and the at least one orientation of the apparatus; a recording mode controller configured to determine at least one recording parameter for the at least one audio signal input from the at least one microphone based on the at least one recording mode; and a digital signal processor configured to apply the at least one recording parameter to the at least one audio signal input.

The apparatus may further comprise at least one user interface input configured to provide at least one user input, and wherein the recording mode determiner configured to determine the recording mode for the apparatus may further comprise determining the recording mode based on the at least one user input.

The recording mode determiner may be configured to determine at least two recording modes for the apparatus based on the location of the microphone and the at least one orientation of the apparatus; the apparatus may further comprise a display configured to present an indication for each of the at least two recording modes for the apparatus: and the user interface input may be configured to provide an user interface input configured to select at least one of the two recording modes for the apparatus.

The display may be configured to present a current recording mode indication and a recommended recording mode indication.

The display may be configured to present a current recording mode indication, a second recording mode indication and a recommended recording mode indication, The display may be configured to present a maintain stereo recording mode indication as the current recording mode indication and a change to mono recording mode indication as the recommended recording mode indication.

The display may be configured to present a maintain surround sound recording mode indication as the current recording mode indication and a change to stereo recording mode indication as the recommended recording mode indication.

The display may be configured to present a maintain surround sound recording mode indication as the current recording mode indication, a change to stereo recording mode indication as the second recording mode indication and a change to mono recording mode indication as the recommended recording mode indication.

The input may be configured to provide at least two signal inputs from at least two microphones, and the at least one microphone configuration determiner may be configured to provide for the at least two microphones locations on the apparatus.

The recording mode controller may comprise at least one of: a selector configured to control selecting which of the at least one audio signal input from the at least one microphone to input; a signal processing parameter determiner configured to determine signal processing parameters for the at least one audio signal input from the at least one microphone to input; and mixer controller configured to determine mixing parameters for the at least one audio signal input from the at least one microphone to input.

The recording mode determiner may be configured to determine a first recording mode for a first recording track for the apparatus based on the location of the microphone and the at least one orientation of the apparatus; and determine a second recording mode for a second recording track for the apparatus based on the location of the microphone and the at least one orientation of the apparatus.

The at least one sensor may be configured to provide at least one orientation change of the apparatus.

The recording mode determiner may be configured to determine at least one recording mode for the apparatus based on the location of the microphone and the at least one orientation change of the apparatus.

The apparatus may comprise at least one microphone configured to provide the at least one audio signal to the at least one audio signal input.

The apparatus may comprise at least two microphones configured to provide the at least two audio signals to the at least two audio signal inputs.

According to a third aspect there is provided an apparatus comprising: means for providing at least one audio signal input from at least one microphone; means for providing for the at least one microphone a location on an apparatus; means for providing at least one orientation of the apparatus; means for determining at least one recording mode for the apparatus based on the location of the at least one microphone and the at least one orientation of the apparatus; means for determining at least one recording parameter for the at least one audio signal input from the at least one microphone based on the at least one recording mode; and means for applying the at least one recording parameter to the at least one audio signal input, The apparatus may further comprise means for providing at least one user input, and wherein the means for determining the recording mode for the apparatus may further comprises means for determining the recording mode based on the at least one user input.

The means for determining at least one recording mode for the apparatus based on the location of the microphone and the at least one orientation of the apparatus may comprise: means for determining at least two recording modes for the apparatus based on the location of the microphone and the at least one orientation of the apparatus; means for presenting an indication for each of the at least two recording modes for the apparatus on a display; and means for selecting at least one of the two recording modes for the apparatus based on a user interface input related to the indication for each of the at least two recording modes for the apparatus on the display.

The means for presenting an indication for each of the at least two recording modes for the apparatus on a display may comprise: means for presenting a current recording mode indication and a recommended recording mode indication; and means for presenting a current recording mode indication, a second recording mode indication and a recommended recording mode indication.

The means for presenting a current recording mode indication and a recommended recording mode indication may comprise at least one of; means for presenting a maintain stereo recording mode indication as the current recording mode indication and a change to mono recording mode indication as the recommended recording mode indication; and means for presenting a maintain surround sound recording mode indication as the current recording mode indication and a change to stereo recording mode indication as the recommended recording mode indication.

The means for presenting a current recording mode indication, a second recording mode indication and a recommended recording mode indication may comprise means for presenting a maintain surround sound recording mode indication as the current recording mode indication, a change to stereo recording mode indication as the second recording mode indication and a change to mono recording mode indication as the recommended recording mode indication.

The means for providing at least one audio signal input from at least one microphone may comprise means for providing at least two signal inputs from at least two microphones, and the means for providing for the at least one microphone a location on an apparatus may comprise means for providing for the at least two microphones locations on the apparatus.

The means for determining at least one recording parameter for the at least one audio signal input from the at least one microphone based on the at least one recording mode may comprise at least one of: means for selecting which of the at least one audio signal input from the at least one microphone to input; means for determining signal processing parameters for the at least one audio signal input from the at least one microphone to input; and means for determining mixing parameters for the at least one audio signal input from the at least one microphone to input.

The means for determining at least one recording mode for the apparatus based on the location of the microphone and the at least one orientation of the apparatus may comprise: means for determining a first recording mode for a first recording track for the apparatus based on the location of the microphone and the at least one orientation of the apparatus; and means for determining a second recording mode for a second recording track for the apparatus based on the location of the microphone and the at least one orientation of the apparatus.

The means for providing at least one orientation of the apparatus may comprise means for providing at least one orientation change of the apparatus.

The means for determining at least one recording mode for the apparatus based on the location of the microphone and the at least one orientation of the apparatus may comprise means for determining at least one recording mode for the apparatus based on the location of the microphone and the at least one orientation change of the apparatus.

The means for providing at least one audio signal may comprise at least one microphone.

The means for providing at least two audio signals may comprise at least two microphones.

According to a fourth aspect there is provided an apparatus comprising at least one processor and at least one memory including computer code for one or more programs, the at least one memory and the computer code configured to with the at least one processor cause the apparatus to at least: provide at least one audio signal input from at least one microphone; provide for the at least one microphone a location on the apparatus; provide at least one orientation of the apparatus; determine at least one recording mode for the apparatus based on the location of the at least one microphone and the at least one orientation of the apparatus; determine at least one recording parameter for the at least one audio signal input from the at least one microphone based on the at least one recording mode; and apply the at least one recording parameter to the at least one audio signal input.

Presenting an indication for each of the at least two recording modes for the apparatus on a display may cause the apparatus to: present a current recording mode indication and a recommended recording mode indication; and present a current recording mode indication, a second recording mode indication and a recommended recording mode indication, Presenting a current recording mode indication and a recommended recording mode indication may cause the apparatus to at least one of: present a maintain stereo recording mode indication as the current recording mode indication and a change to mono recording mode indication as the recommended recording mode indication; and present a maintain surround sound recording mode indication as the current recording mode indication and a change to stereo recording mode indication as the recommended recording mode indication.

Presenting a current recording mode indication, a second recording mode indication and a recommended recording mode indication may cause the apparatus to present a maintain surround sound recording mode indication as the current recording mode indication, a change to stereo recording mode indication as the second recording mode indication and a change to mono recording mode indication as the recommended recording mode indication.

The apparatus may be further caused to provide at least one user input, and wherein determining the recording mode for the apparatus may further cause the apparatus to determine the recording mode based on the at least one user input.

Determining at least one recording mode for the apparatus based on the location of the microphone and the at least one orientation of the apparatus may cause the apparatus to: determine at least two recording modes for the apparatus based on the location of the microphone and the at least one orientation of the apparatus; present an indication for each of the at least two recording modes for the apparatus on a display; and select at least one of the two recording modes for the apparatus based on a user interface input related to the indication for each of the at least two recording modes for the apparatus on the display.

Providing at least one audio signal input from at least one microphone may cause the apparatus to provide at least two signal inputs from at least two microphones, and providing for the at least one microphone a location on an apparatus may cause the apparatus to provide for the at least two microphones locations on the apparatus.

Determining at least one recording parameter for the at least one audio signal input from the at least one microphone based on the at least one recording mode may cause the apparatus to at least one of: select which of the at least one audio signal input from the at least one microphone to input; determine signal processing parameters for the at least one audio signal input from the at least one microphone to input; and determine mixing parameters for the at least one audio signal input from the at least one microphone to input.

Determining at least one recording mode for the apparatus based on the location of the microphone and the at least one orientation of the apparatus may cause the apparatus to: means for determine a first recording mode for a first recording track for the apparatus based on the location of the microphone and the at least one orientation of the apparatus; and determine a second recording mode for a second recording track for the apparatus based on the location of the microphone and the at least one orientation of the apparatus.

Providing at least one orientation of the apparatus may cause the apparatus to provide at least one orientation change of the apparatus, Determining at least one recording mode for the apparatus based on the location of the microphone and the at least one orientation of the apparatus may cause the apparatus to determine at least one recording mode for the apparatus based on the location of the microphone and the at least one orientation change of the apparatus.

The apparatus may comprise at least one microphone configured to provide the at least one audio signal.

The apparatus may comprise at least two microphones configured to provide the at least two audio signals.

Embodiments of the present application aim to address problems associated with the state of the art,

SUMMARY OF THE FIGURES

For better understanding of the present application, reference will now be made by way of example to the accompanying drawings in which:

FIG. 12 shows schematically an example user interface settings output for a two microphone configuration as shown in FIG. 4;

FIG. 14 shows schematically an example user interface settings output for a four microphone (4A) configuration as shown in FIG. 7;

FIGS. 20 and 21 show example device microphone locations according to some embodiments;

EMBODIMENTS

The following describes in further detail suitable apparatus and possible mechanisms for the provision of microphone switching and configuration for surround sound recording or capture operations and particularly in mobile or portable apparatus.

As described herein apparatus or devices with fixed microphone configurations can when attempting to record the audio surroundings be orientated to locate the microphones according to a first arrangement in such a way (for example for landscape mode video recording) that surround sound can be recorded but then orientated to locate the microphones according to a further arrangement (for example for portrait mode video recording) so that surround sound cannot be recorded or will produce poor surround sound (multichannel) reproduction due to the lack of microphones in a suitable plane and within an acceptable angle of the horizontal.

Similarly the microphone configuration and therefore orientation of the apparatus or device affects any audio signal processing performed on the recorded audio signals such as noise cancellation and beamforming signal processing.

The concept of embodiments of the application is thus to enable the selection and use of microphones and therefore configuration of audio channels based on the orientation of the device or application. Furthermore the embodiments describe selection and application of audio channel input data based the apparatus fixed configuration. Also in some embodiments the interaction of the user to affect selection and application of audio channel input data further based on the apparatus or device fixed and variable configurations is described.

For example the embodiments described herein show microphone locations that enable audio channel configuration selection. For example where the device or apparatus can be configured to enable, in landscape orientation, surround sound recording and the apparatus in portrait mode can be enabled to record stereo. Similarly there can be embodiments where in landscape mode stereo recording is possible while in portrait mode only mono recording is practical.

The embodiments as described herein further show how the user can override the preferred default channel or microphone configurations based on the orientation and configuration of the apparatus or device.

Figure 1:
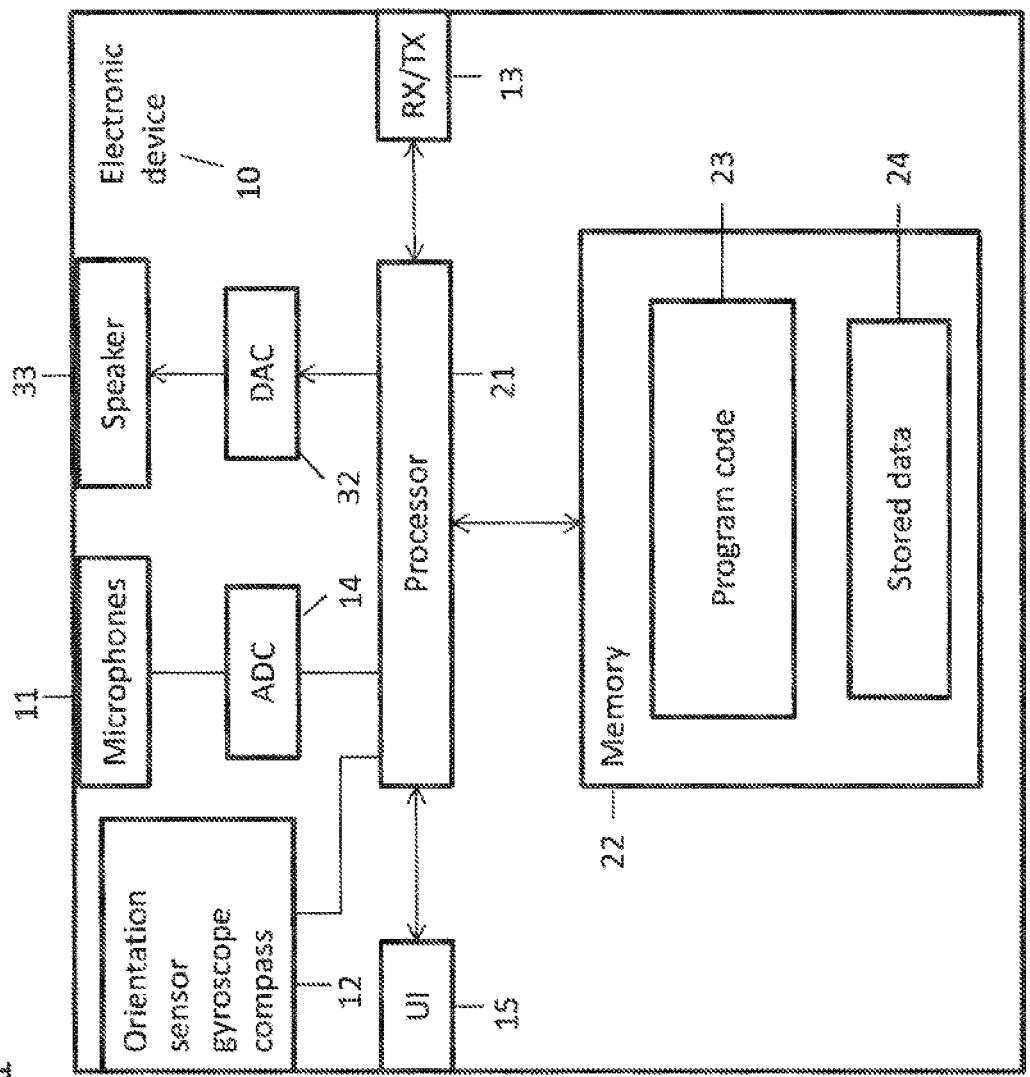
FIG. 1 shows schematically an apparatus suitable for being employed in some embodiments.

FIG. 1 shows an overview of a suitable system within which embodiments of the application can be implemented. FIG. 1 shows an example of an apparatus or electronic device 10. The electronic device 10 may be used to record or listen to audio signals and may function as a recording apparatus.

The electronic device 10 may for example be a mobile terminal or user equipment of a wireless communication system when functioning as the recording apparatus. In some embodiments the apparatus can be an audio recorder, such as an MPt3 player, a media recorder/player (also known as an MN player), or any suitable portable apparatus suitable for recording audio or audio/video camcorder/memory audio or video recorder.

The apparatus 10 may in some embodiments comprise an audio subsystem. The audio subsystem for example can comprise in some embodiments at least two microphones or array of microphones 11 for audio signal capture. In some embodiments the at least two microphones or array of microphones can be a solid state microphone, in other words capable of capturing audio signals and outputting a suitable digital format signal. In some other embodiments the at least two microphones or array of microphones 11 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or micro electrical-mechanical system (MBAS) microphone. In some embodiments the microphone 11 is a digital microphone array, in other words configured to generate a digital signal output (and thus not requiring an analogue-to-digital converter), The microphone 11 or array of microphones can in some embodiments output the audio captured signal to an analogue-to-digital converter (ADC) 14.

In some embodiments the apparatus can further comprise an analogue-to-digital converter (ADC) 14 configured to receive the analogue captured audio signal from the microphones and outputting the audio captured signal in a suitable digital form. The analogue-to-digital converter 14 can be any suitable analogue-to-digital conversion or processing means. In some embodiments the microphones are 'integrated' microphones containing both audio signal generating and analogue-to-digital conversion capability.

In some embodiments the apparatus 10 audio subsystems further comprises a digital-to-analogue converter 32 for converting digital audio signals from a processor 21 to a suitable analogue format. The digital-to-analogue converter (DAC) or signal processing means 32 can in some embodiments be any suitable DAC technology, Furthermore the audio subsystem can comprise in some embodiments a speaker 33. The speaker 33 can in some embodiments receive the output from the digital-to-analogue converter 32 and present the analogue audio signal to the user. In some embodiments the speaker 33 can be representative of multi-speaker arrangement, a headset, for example a set of headphones, or cordless headphones.

Although the apparatus 10 is shown having both audio capture and audio presentation components, it would be understood that in some embodiments the apparatus 10 can comprise only the audio capture part of the audio subsystem such that in some embodiments of the apparatus the microphones (for audio capture) are present.

In some embodiments the apparatus 10 comprises a processor 21. The processor 21 is coupled to the audio subsystem and specifically in some examples the analogue-to-digital converter 14 for receiving digital signals representing audio signals from the microphone 11, and the digital-to-analogue converter (DAC) 12 configured to output processed digital audio signals. The processor 21 can be configured to execute various program codes. The implemented program codes can comprise for example audio channel configuration determination, audio channel selection and audio signal processing routines.

In some embodiments the apparatus further comprises a memory 22. In some embodiments the processor is coupled to memory 22. The memory can be any suitable storage means. In some embodiments the memory 22 comprises a program code section 23 for storing program codes implementable upon the processor 21. Furthermore in some embodiments the memory 22 can further comprise a stored data section 24 for storing data, for example data that has been recorded or analysed in accordance with the application. The implemented program code stored within the program code section 23, and the data stored within the stored data section 24 can be retrieved by the processor 21 whenever needed via the memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments comprise a touch screen or touch interface capable of both enabling information to be entered to the apparatus 10 and further displaying information to the user of the apparatus 10.

In some embodiments the apparatus user interface 15 comprises a display on which information about the apparatus or device can be output. The display or image display means can be configured to output visual images which can be viewed by the user of the apparatus. In some embodiments the display can be a touch screen display suitable for supplying input data to the apparatus. The display can be any suitable display technology, for example the display can be implemented by a fiat panel comprising cells of LCD, LED, OLED, or 'plasma' display implementations, In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The coupling can be any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA), In some embodiments the device or apparatus 10 further comprises a direction or orientation sensor 12. The orientation/direction sensor 12 can in some embodiments be an electronic compass, accelerometer, and a gyroscope or be determined by the motion of the apparatus using the positioning estimate. Furthermore in some embodiments the direction or orientation sensor can be part of a position sensor configured to estimate the position of the apparatus 10. The position sensor can in some embodiments be a satellite positioning sensor such as a GPS (Global Positioning System), GLONASS or Galileo receiver. In some embodiments the position sensor can be a cellular ID system or an assisted GPS system.

It is to be understood again that the structure of the electronic apparatus or device 10 could be supplemented and varied in many ways.

Figure 2:
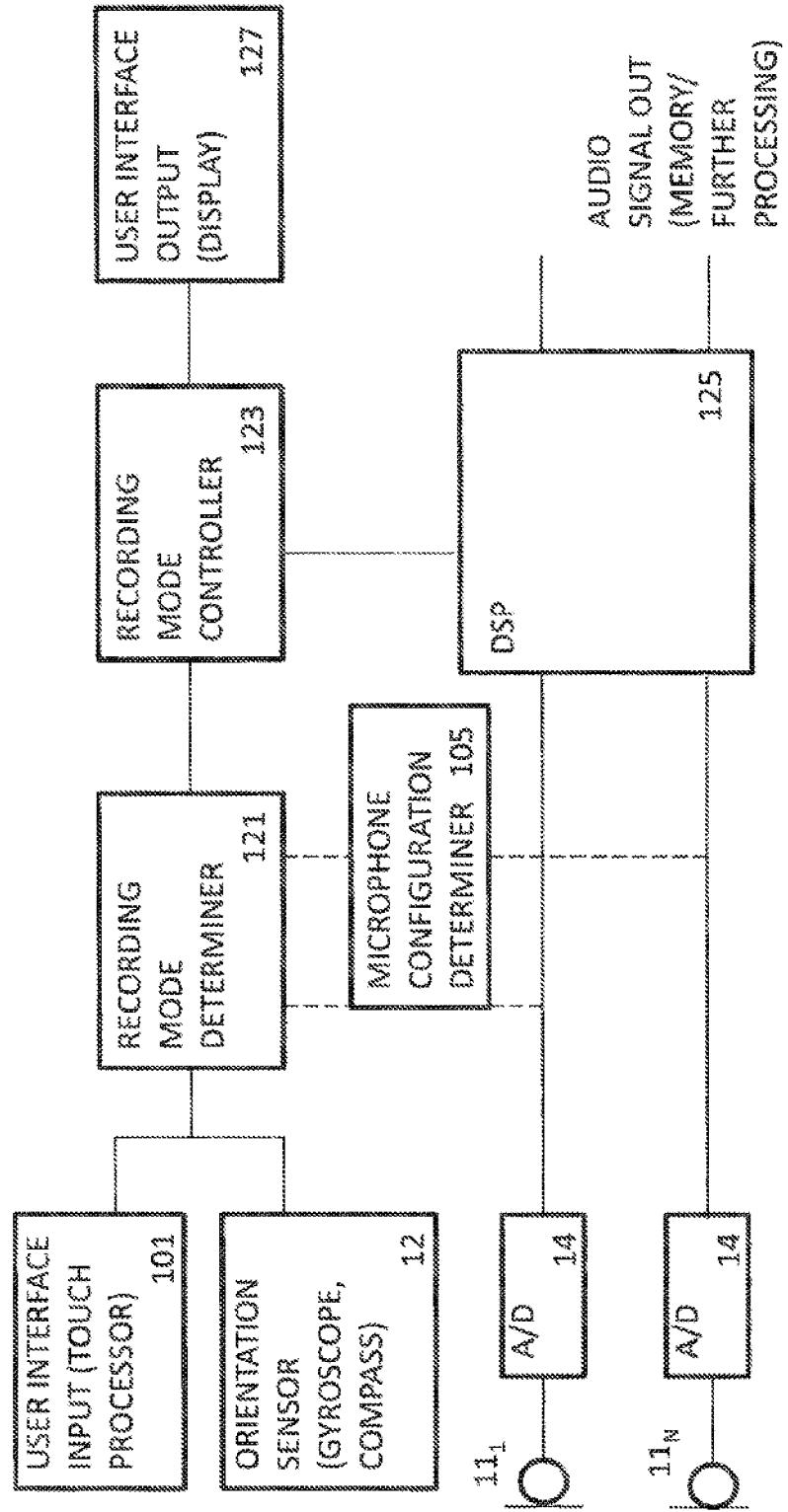
FIG. 2 shows schematically an example of a surround sound recording microphone switching apparatus according to some embodiments.

With respect to FIG. 2 an example multiple microphone recording apparatus is shown. Furthermore with respect to FIG. 3 the operation of the multi-microphone recording apparatus shown in FIG. 2 is described in further detail.

In some embodiments the apparatus comprises microphones $11_1$ to $11_n$. The microphones can be arranged or configured on the apparatus according to any suitable arrangement or configuration. The arrangement can be either defined or determined by the apparatus as described herein.

The microphone 11 can record the audio signals and pass these to a suitable analogue to digital converter 14.

Figure 3:
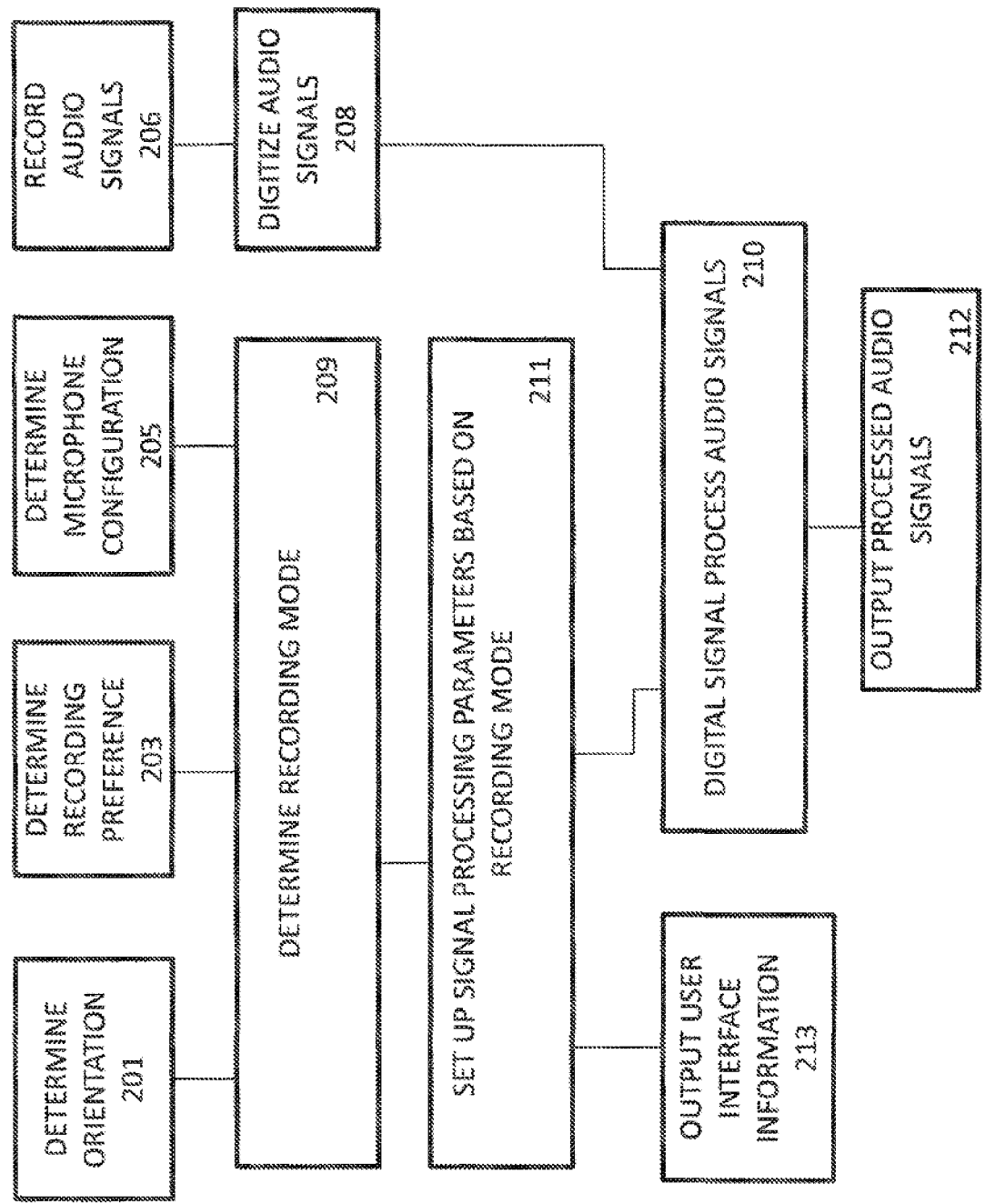
FIG. 3 shows a flow diagram of the operation of a surround sound recording microphone switching apparatus as shown in FIG. 2 according to some embodiments.

The operation of recording the audio signals from the microphones is shown in FIG. 3 by step 206.

In some embodiments the apparatus comprises at least one analogue to digital converter 14. In the example shown in FIG. 2 there is an analogue to digital converter 14 coupled to each of the microphones 11 and configured to digitise the analogue audio signal from each of the microphones 11.

The digitised audio signals can then be passed to the digital signal processor 125.

The operation of digitising the audio signals is shown in FIG. 3 by step 208.

In some embodiments the apparatus comprises a user interface input 101 or means for user interface input. The user interface input 101 can be any suitable input processor configured to receive a user interface 15 such as for example a touch processor configured to process a touch screen input and configured to generate suitable user interface data. For example in some embodiments the user interface input 101 is configured to provide an indication of a user's recording preference selection, such as selecting between surround sound recording, stereo recording, or mono recording.

In some embodiments the user interface input 101 can thus output the recording preference to the recording mode determiner 121.

The operation of determining the recording preference is shown in FIG. 3 by step 203.

In some embodiments the apparatus comprises an orientation sensor 12 or orientation determining means. The orientation sensor 12 can for example be a gyroscope, accelerometer or compass configured to determine the phone position and orientation and pass this information to the recording mode determiner 121. In some embodiments the orientation sensor 12 can be any sensor configured to determine the orientation of the apparatus or device. In the following examples the orientation of the apparatus can be defined as being either portrait or landscape, however it would be understood that in some embodiments there can be other defined apparatus or device orientations such as sideways (in other words orientated as if flat on a surface), reverse landscape (and reverse portrait. In some embodiments the orientation is defined not by 90 degree orientation differences but by any suitable range of orientation. For example in some embodiments the orientation of the apparatus or device is defined by sectors of orientation for one or more of the three rotational dimensions (roll, pitch, yaw), For example, there may be sections for yaw for every 10 degrees rotation resulting in 36 yaw orientation sections.

The operation of determining the orientation of the apparatus is shown in FIG. 3 by step 201.

Furthermore the apparatus can comprise a microphone configuration determiner 105 or means for determining a microphone configuration. The microphone configuration determiner 105 can in some embodiments determine spatial and orientation configuration relating to the positioning of the microphones relative to each other and located on the apparatus. In some embodiments the microphone configuration determiner 105 can be configured to receive the information on microphone positioning or location from the microphones themselves, for example where the microphones are adjustable or movable. For example in some embodiments where the microphones are adjustable or movable then the position orientation of the microphones can be reflected in the user interface information and in the settings as the positioning of the microphones enables/disables different channel recording configurations. In some embodiments the microphone configuration determiner 105 can be configured to read a microphone configuration file or location configuration information from a memory, for example from an apparatus configuration file defining the microphone fixed locations relative to the apparatus. In other words in some embodiments the at least one microphone location or position could be known in advance by the apparatus or device already. Thus a determination of the microphone locations and/or orientations can be predetermined or known as well as being determined in real time. The microphone configuration determiner 105 can thus be configured to output microphone configuration information to the recording mode determiner 121.

The operation of determining microphone configuration is shown in FIG. 3 by step 205.

In some embodiments the apparatus comprises a recording mode determiner 121 or means for determining a recording mode. The recording mode determiner 121 can be configured to receive information regarding the user interface input on the recording preference, information regarding to the orientation of the apparatus or device from the orientation sensor 103, and the microphone positioning or location configuration from the microphone configuration determiner 105 and from this information determine and enable a recording mode. In some embodiments the recording mode determiner 121 can be configured to determine more than one recording mode is available, and select at least one from the available modes, In some embodiments the apparatus can be configured to present the available recording modes to the user to select at least one of the modes. In some embodiments the recording mode determiner 121 can furthermore be configured to indicate which of the microphones can be used to achieve the at least one recording mode selected. It would be understood that in some embodiments where there is more than one track being recorded that more than one configuration from the available configurations of microphones can be selected. Furthermore in multiple track operations for each selection or configuration similar operations as described herein with respect to the single microphone selection or configuration operation can be performed for each track or recording. For example providing the apparatus orientation is known, the recording mode determiner or other means would know the microphone location relative to the apparatus orientation. Furthermore in some embodiments the apparatus orientation is determined and based on the apparatus orientation the number of microphones are assigned based on the relative relationship.

It would be understood that the configuration selection can in some embodiments be a pre-configuration or configuration setting or settings within the apparatus. In other words that the at least one recording track is determined using settings stored on the apparatus or downloaded to the apparatus and can be determined without the need for further user interface input.

An example partial look up table (with no user interface input) for a 4 microphone arrangement (microphones A, B, C, and D located at the corners of the apparatus) can be as follows where the priority column indicates the priority of the recording mode and/or microphone selection for the orientation input indicating that the 1st priority for portrait orientation mono recording uses Mic A and the 2'1 priority uses Mic B in the case that Mic A is faulty or blocked (or in some way unable to be selected) and so on. Furthermore it would be understood that in some embodiments more than one of the rows (in other words microphone selections) can be selected for separate tracks. In other words track A can select landscape stereo A-C configuration and track B can select landscape mono A configuration.

| Apparatus orientation Input | Recording Mode Output | Microphone Selection/Combination | Priority |
|---|---|---|---|
| Landscape | Mono | A | 1 |
| | | B | 2 |
| | | C | 3 |
| | | D | 4 |
| Portrait | | A | 1 |
| | | B | 2 |
| | | C | 3 |
| | | D | 4 |
| "Sideways" | | ... | ... |
| Landscape | Stereo | A-C | 1 |
| | | B-D | 2 |
| | | A-D | 3 |
| | | B-C | 4 |
| Portrait | | B-A | 1 |
| | | D-C | 2 |
| | | B-C | 3 |
| | | D-A | 4 |
| "Sideways" | | ... | ... |
| ... | multi-channel | A-B-C | ... |

In some embodiments the recording mode determiner 121 can determine the at least one available recording modes by processing the received information by using a look up table (or similar) whereby the inputs enable selected recording mode outputs. The recording mode determiner 121 can in some embodiments output a recording mode indicator to a recording mode controller 123.

The operation of determining the recording mode is shown in FIG. 3 by step 209.

In some embodiments the apparatus comprises a recording mode controller 123 or means for controlling the recording mode. The recording mode controller 123 is configured to receive the determined recording mode from the recording mode determiner 121. The recording mode controller 123 can then be configured to look up (or generate or calculate) any recording parameters required. The recording mode controller 123 can then be configured to generate a series of signal processing parameters to be applied to the microphone input signals based on the recording mode.

The updating of recording parameters can in some embodiments be performed by the recording mode controller 123 in order to compensate for the change in the physical position of active microphone or microphones being used for audio recording. An example of an audio capture parameter can be the active microphone distance. It would be understood that on selecting a different combination of microphones causes a change in the active microphone distance determination.

These recording mode based signal processing parameters can then be passed to a digital signal processor 125.

The setting up of the signal processing parameters based on the recording mode is shown in FIG. 3 by step 211.

In some embodiments the recording mode controller 123 can be further configured to output an indicator to a user interface output (such as a display) of the recording mode determined and in some embodiments the recording parameters used.

In some embodiments the apparatus comprises a user interface 15 output (for example as shown in FIG. 2 a display 127). The user interface output or means for providing a user interface output can be configured to output information indicating which recording mode has been selected or in some embodiments the recording modes determined to be suitable. In some embodiments the user interface output can further be configured to indicate or display to the user the parameters being used with the recording mode. For example the user interface output can indicate which microphones are being used to record the audio environment.

The operation of outputting the user interface information is shown in FIG. 3 by step 213.

In some embodiments the apparatus comprises a digital signal processor 125 or means for digital signal processing audio signals. The digital signal processor 125 can be configured to receive the digital forms of the recorded audio signals from each of the microphones 11. The digital signal processor can further be configured to receive the signal processing parameters determined by the recording mode controller 123. The digital signal processor can then be configured to process the audio signals recorded from the microphones 11 according to the signal processing parameters. It would be understood that any suitable signal processing can be performed such as filtering, equalising, attenuating, amplifying, switching, mixing, or otherwise.

For example the digital signal processor 125 can be configured to multiplex the audio signals from the microphones 11 to select the microphone audio signals determined by the recording mode determiner 121 and recording mode controller 123 in order to achieve the determined recording mode.

The operation of digital signal processing the audio signals is shown in FIG. 3 by step 210.

Furthermore the digital signal processor can then output the audio signals which have been digitally processed.

The operation of outputting the processed audio signals is shown in FIG. 3 by step 212.

With respect to FIGS. 4 to 9 a series of example microphone configurations are shown. It would be understood that the microphone positions in these figures are examples of possible microphone positions on the apparatus and the embodiments described herein example configuration selections based on these example possible positions. Thus in some other embodiments the microphone positions or locations can differ from the example positions shown herein, yet the implementation of the apparatus and methods as described herein be similarly applied. Furthermore in the following examples the indication of the microphone may be understood to be the microphone inlet or the port (through which acoustic waves enter the apparatus to pass to the microphone transducer) rather than the microphone transducer itself. Thus for example (with respect to FIG. 4) Mic 1 (or the microphone inlet or port) can be located on the front surface or on the bottom surface or in the edge between the front and bottom surface. Similarly Mic 3 (or the microphone inlet or port) could be left-right central. In other words the possible configurations are determined by the relative location of the microphones (inlets or ports) of which some examples are provided herein.

Figure 4:
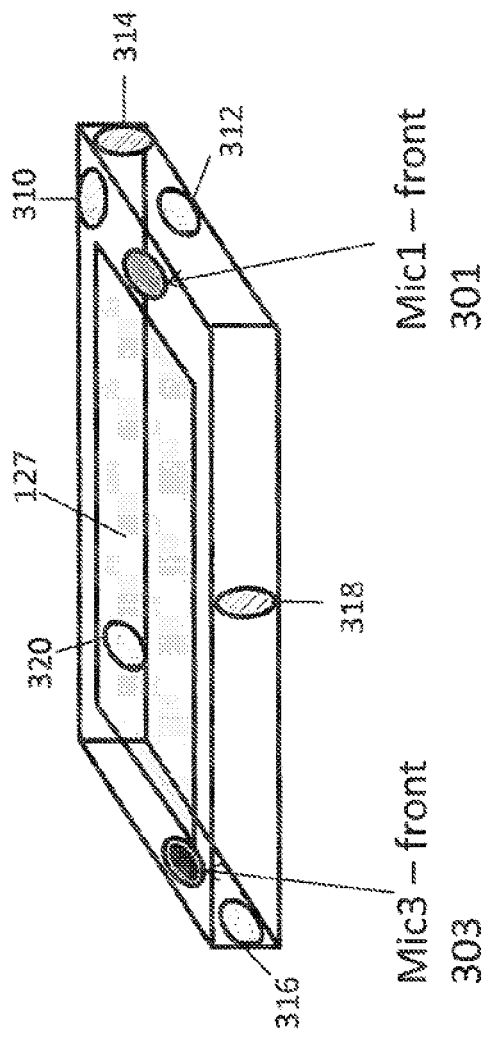
FIG. 4 shows schematically an example two microphone configuration for a mobile device according to some embodiments.

With respect to FIG. 4 an example 2-microphone apparatus or device implementing embodiments as described herein is described in further detail. In this and the further examples as shown herein the device front is defined with respect to the display 127 located approximately centrally on the front surface 310 of the apparatus or device. Furthermore the surface opposite to the front surface is defined in this and the following examples as the rear surface 312. Furthermore in the examples shown herein the first microphone Mic 1 301 defines a top-bottom orientation of the device or apparatus by being located towards the 'bottom' of the front surface and therefore adjacent a bottom edge or bottom surface 314. Furthermore with respect to the remaining surfaces, the surface or edge opposite the bottom surface or edge is the top surface 316, the surface or edge joining the top and bottom surface to the left of the front surface is the left-hand (side) surface (or edge) 318 and the surface to the right of the front surface is the right-hand (side) surface 320.

As shown in FIG. 4 the apparatus or device comprises a first microphone Mic 1 301 located on the front surface of the device, approximately left-right central, and located towards the bottom of the device or apparatus, Furthermore the apparatus comprises a second microphone Mic 3 303 also located on the front surface of the device or apparatus, located on the left side of the top of the device or apparatus. The configuration of the microphones is such that when in landscape orientation the configuration of the apparatus enables recording of the stereo signal using both microphones and when in portrait orientation enables recording of a mono signal using either microphone.

This apparatus or device can thus comprise a recording mode determiner which uses the following look-up table, where the priority column indicates the priority of the recording mode and/or microphone selection for the orientation input indicating that the 1st priority for portrait orientation is mono recording using Mic 1 and the 2nd priority is portrait orientation is mono recording using Mic 3, the 1St priority for landscape mode is stereo recording using Mic 1 and 2 and so on,

| Apparatus orientation Input | Recording Mode Output | Microphone Selection/Combination | Priority |
| --- | --- | --- | --- |
| Portrait | Mono | 1 | 1 |
| Portrait | Mono | 3 | 2 |
| Landscape | Stereo | 1 + 3 | 1 |
| Landscape | Mono | 1 | 2 |
| Landscape | Mono | 3 | 3 |

The reason for this configuration is being the preferred solution is that when the microphones are at the end of the apparatus and in portrait mode they are both in approximately in the same X-axis (in other words approximately vertically above each other and therefore do not have sufficient horizontal separation to accurately distinguish between signals in the Y-Z plane.

In some embodiments as described herein the recording mode determiner 121 can be configured to use the input from the user interface input to influence the determination. For example with respect to FIG. 12 a user interface preference display image is shown which can be used to provide a suitable input to the recording mode determiner with respect to selecting whether the portrait orientation recording mode preference is mono or stereo recording. In the following examples the user interface preference display image shows the use of radio buttons for user input selection, however it would be understood that any suitable selection user interface means can be displayed and used in embodiments, The user interface display 1100 comprises two radio buttons, a first 'change to mono' radio button 1101 which is set as the default option for the reasons as indicated herein and a second 'maintain stereo' radio button' 1103. The recording mode determiner 121 can in such embodiments when portrait orientation is determined by the orientation sensor 12 use the user interface input to select whether the recording mode is mono or stereo. In other words recording mode determiner can apply an example look up table such as the following:

| Apparatus orientation Input | User Interface Recording Preference Input | Recording Mode Output | Microphone Selection/Combination | Priority |
| --- | --- | --- | --- | --- |
| Portrait | Change to Mono | Mono | 1 | 1 |
| Portrait | Change to Mono | Mono | 3 | 2 |
| Portrait | Maintain Stereo | Stereo | 1 + 3 | 1 |
| Landscape | | Stereo | 1 + 3 | 1 |
| Landscape | | Mono | 1 | 2 |
| Landscape | | Mono | 3 | 3 |

Figure 15:
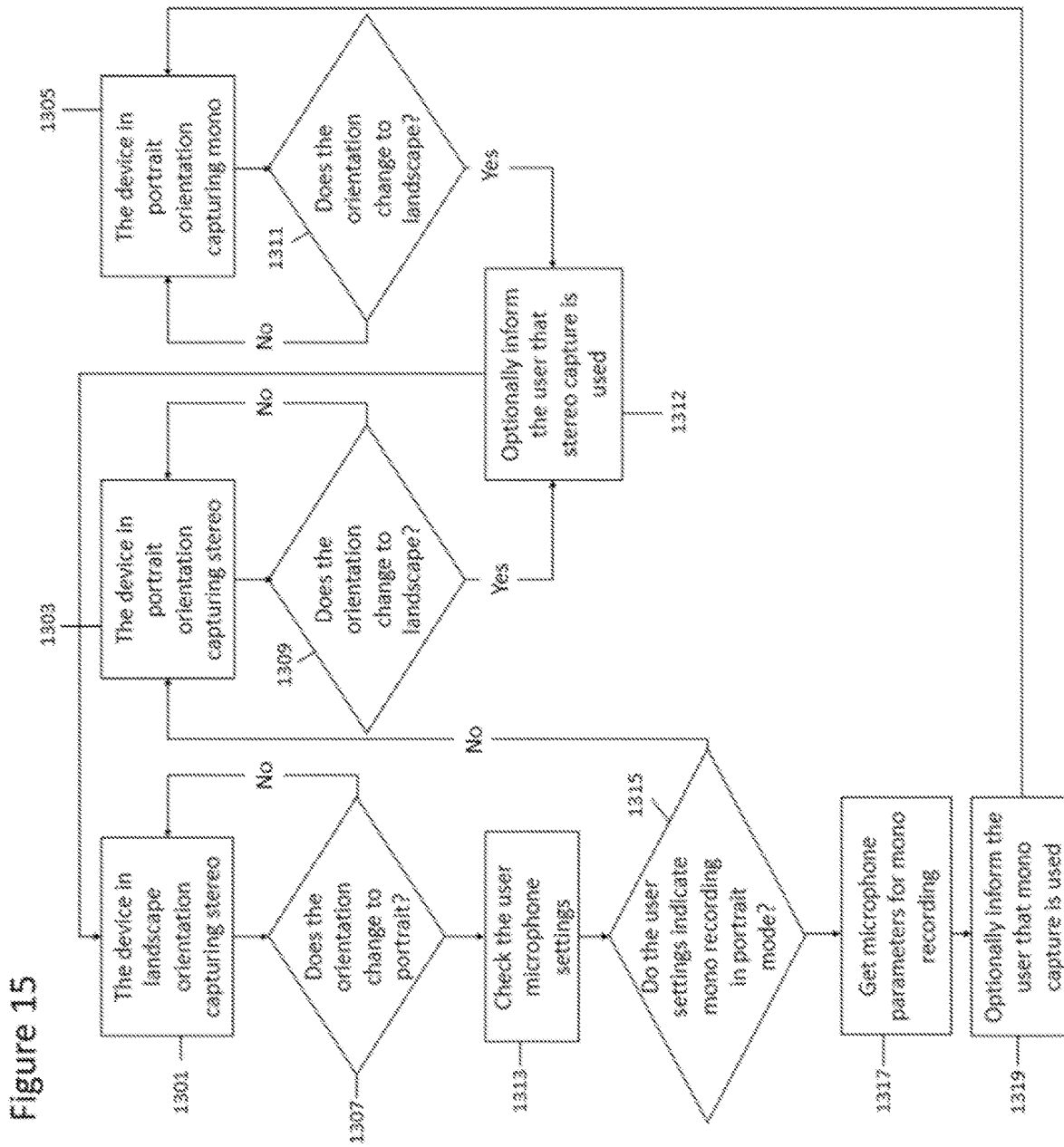
FIG. 15 shows an example flow diagram of the operating mode setting logic for a two microphone configuration as shown in FIG. 4.

FIG. 15 furthermore shows a flow diagram of the operating modes or setting logic for a two microphone configuration as shown in FIG. 4.

In the following example the apparatus or device is recording or capturing a stereo signal while in landscape orientation.

The step of the device being in landscape orientation capturing stereo is shown in FIG. 15 by step 1301.

As described herein the orientation sensor 12 is configured to monitor for orientation changes and specifically whether the orientation of the device changes to portrait orientation.

The check or determination of whether the orientation changes to portrait is shown in FIG. 15 by step 1307.

Where the orientation is not changed the flow diagram loops back to step 1301 (the device remains in stereo recording mode in landscape orientation.

Where the orientation changes to portrait the recording mode determiner checks the user interface input recording preference or in other words the user microphone settings. This can in some embodiments be an internal check of the settings or initiate the display to show the user interface output such as shown in FIG. 12 enabling the user to select whether the settings are to remain as the recommended mono mode of recording or to fix the recording mode as a stereo mode.

The operation of checking or retrieving the microphone settings or recording mode preference is shown in FIG. 15 by step 1313.

In some embodiments the recording mode determiner 121 can be configured to check the settings as whether they indicated the mono recording in portrait orientation is the preferred option.

The operation of checking whether mono recording or capture when the apparatus or device is in portrait orientation or mode is shown in FIG. 15 by step 1315.

Where the settings show that mono recording in portrait mode is not selected then device is configured to operate to capture stereo audio in portrait orientation. in other words the stereo recording mode for portrait orientation parameters can be determined by the recording mode controller 123 and the mic 1 and mic 3 inputs received, processed and output to be recorded or output.

The operation of the device in portrait orientation capturing stereo signals is shown in FIG. 15 by step 1303.

Where the settings show that mono recording in portrait mode is selected then the device is configured to operate to capture mono audio in portrait orientation.

The recording mode controller 123 can be configured in some embodiments to get or determine microphone parameters for mono recording. These can for example be digital signal processing parameters for selecting one or other of the microphones as the input or mixing parameters for mixing the inputs.

The operation of getting or determining the microphone parameters for mono recording is shown in FIG. 15 by step 1317.

In some embodiments the recording mode controller can use the user interface output such as the display 127 to optionally inform the user that mono recording is being used.

The operation of informing the user that mono capture use is in operation is shown in FIG. 15 by step 1319.

The recording mode controller 123 can then apply the parameters for mono recording and therefore the device in portrait orientation is configured to capture or record mono audio signals, The operation of mono recording in portrait orientation is shown in FIG. 15 by step 1305.

As described herein the orientation sensor 12 is configured to monitor for orientation changes and whether the orientation of the device changes to landscape orientation from portrait.

The check or determination of whether the orientation changes from portrait to landscape is shown in FIG. 15 by step 1309 where the device is recording in stereo as shown in step 1303, or by step 1311 where the device is recording in mono as shown in step 1305.

Where the determination does not detect a change to landscape then the device remains recording or capturing in stereo as shown in step 1303 or in mono as shown in step 1305, However when a change to landscape is detected or determined then the recording mode determiner 121 can determine a change in recording mode, and the recording mode controller 123 can determine the stereo (or in some cases mono) recording parameters and apply these such that the operation passes to step 1301 where the device is in landscape orientation capturing stereo signals.

In some embodiments where the orientation sensor 12 detects or determines a change in the orientation from portrait to landscape the recording mode controller 123 can output to the user interface output display 127 an indication to the user that stereo capture is being applied.

The operation of displaying to the user that stereo recording is being applied is shown in FIG. 15 by step 1312.

Figure 5:
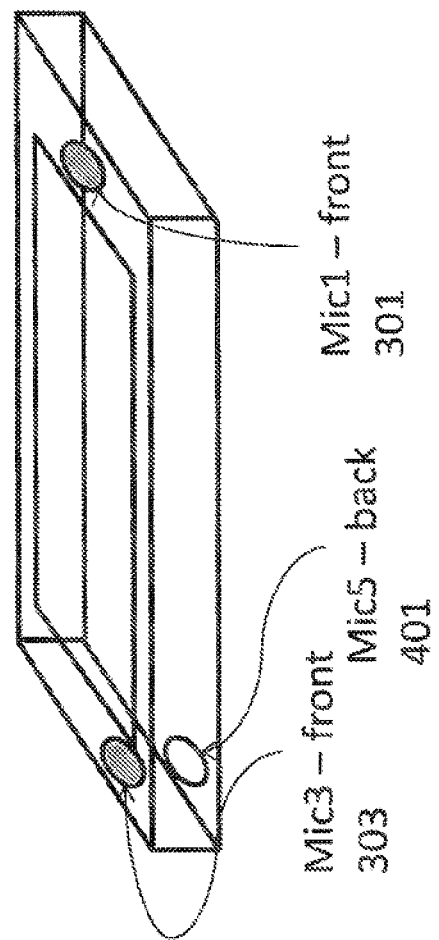
FIG. 5 shows schematically a first (3A) example three microphone configuration for a mobile device according to some embodiments.

With respect to FIG. 5 a first 3-microphone configuration apparatus or device implementing embodiments as described herein is described in further detail, The 3-microphone apparatus, configuration A (3A), features apparatus comprising a first microphone Mic 1 301 located on the front surface of the device, approximately left-right central, and located towards the bottom of the device or apparatus. Furthermore the apparatus comprises a second microphone Mic 3 303 also located on the front surface of the device or apparatus, located on the left side of the top of the device or apparatus and a third microphone Mic 5 401 located on the rear or back surface of the apparatus (opposite the second microphone Mic 3 303), The configuration of the microphones is such that when in landscape orientation the configuration of the apparatus enables surround sound recording using Mic 1 301, Mic 3 303, and Mc 5 401 or stereo signal using Mic 1 301 and either Mc 3 303 or Mic 5 401 and when in portrait orientation enables mono recording using either Mc 1 301, Mic 3 303 or Mc 5 401.

This apparatus or device can thus comprise a recording mode determiner which uses the following look-up table, where the priority column indicates the priority of the recording mode and/or microphone selection for the orientation input.

| Apparatus orientation Input | Recording Mode Output | Microphone Selection/Combination | Priority |
| --- | --- | --- | --- |
| Portrait | Mono | 1 | 1 |
| Portrait | Mono | 3 | 2 |
| Portrait | Mono | 5 | 3 |
| Landscape | Surround | 1 + 3 + 5 | 1 |
| Landscape | Stereo | 1 + 3 | 2 |
| Landscape | Stereo | 1 + 5 | 3 |
| Landscape | Mono | 1 | 4 |
| Landscape | Mono | 3 | 5 |
| Landscape | Mono | 5 | 6 |

The reason for this configuration is being the preferred solution is that the microphones are at the ends of the apparatus and in portrait mode they are all approximately at the same X-coordinate (in other words approximately vertically above each other and therefore do not have sufficient horizontal separation to accurately distinguish between signals in the Y-Z plane.

In some embodiments as described herein the recording mode determiner 121 can be configured to use the input from the user interface input to influence the determination. For example with respect to FIG. 13 a user interface preference display image is shown which can be used to provide a suitable input to the recording mode determiner with respect to selecting whether the portrait orientation recording mode preference is mono, stereo or surround recording.

The user interface display 1250 comprises three radio buttons, a first 'change to mono' radio button 1251 which is set as the default option for the reasons as indicated herein, a second 'maintain surround sound' radio button 1253, and a third 'change to stereo' radio button 1255. The recording mode determiner 121 can in such embodiments when portrait orientation is determined by the orientation sensor 12 use the user interface input to select whether the recording mode is changed to mono, stereo or maintained as being surround sound. In other words a partial recording mode determiner look up table for portrait orientation can be the following:

| Apparatus orientation Input | User Interface Recording Preference Input | Recording Mode Output | Microphone Selection/Combination | Priority |
|---|---|---|---|---|
| Portrait | Change to Mono | Mono | 1 | 1 |
| Portrait | Change to Mono | Mono | 3 | 2 |
| Portrait | Change to Mono | Mono | 5 | 3 |
| Portrait | Change to Stereo | Stereo | 1 + 3 | 1 |
| Portrait | Change to Stereo | Stereo | 1 + 5 | 2 |
| Portrait | Maint. Surround | Surround | 1 + 3 + 5 | 1 |

Figure 16:
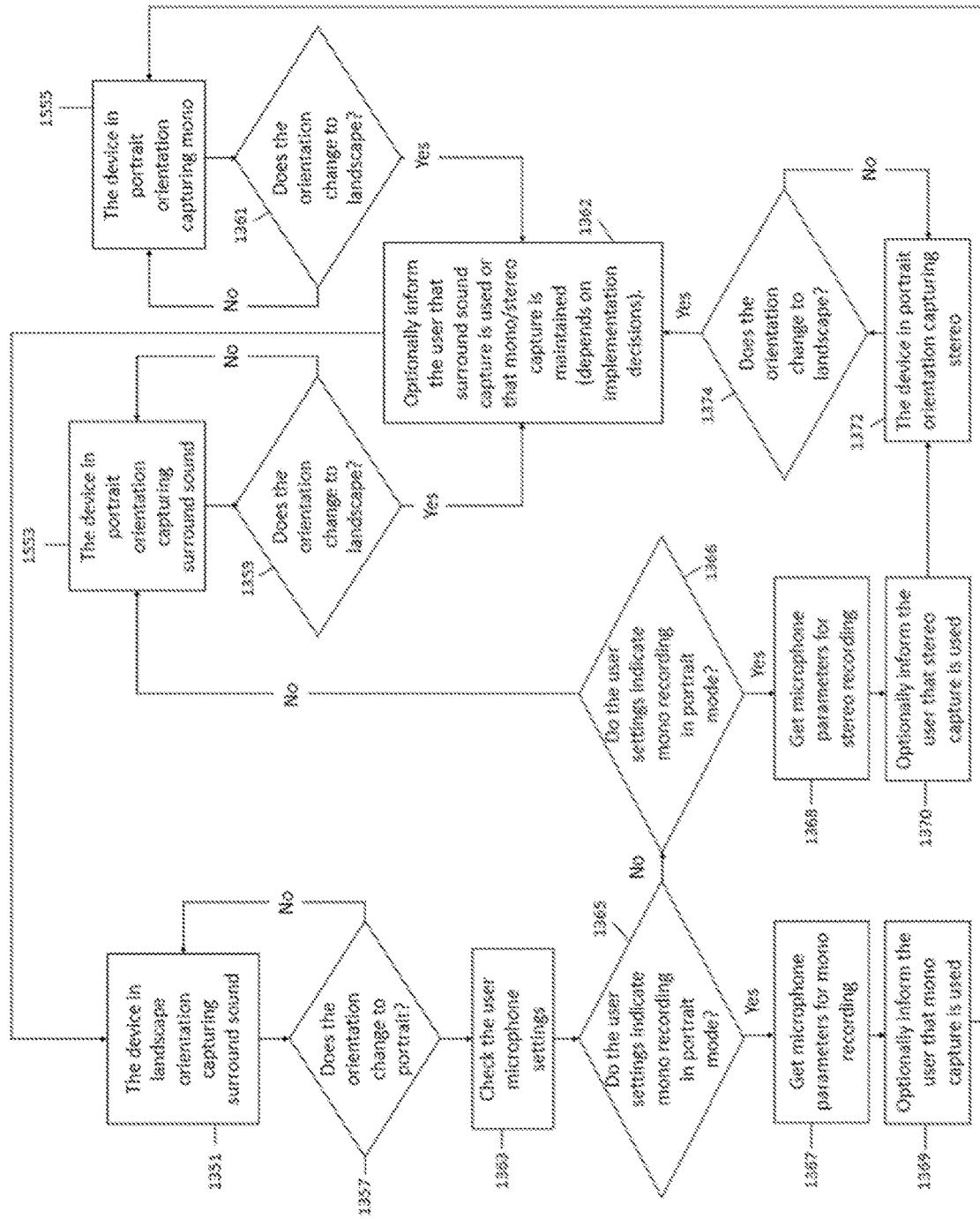
FIG. 16 shows an example flow diagram of the operating mode setting logic for a three microphone (3A) configuration as shown in FIG. 5.

FIG. 16 furthermore shows a flow diagram of the operating modes or setting logic for a three microphone configuration (Configuration 3A) as shown in FIG. 5.

In the following example the apparatus or device is recording or capturing a surround sound signal while in landscape orientation.

The step of the device being in landscape orientation capturing surround sound is shown in FIG. 16 by step 1351.

As described herein the orientation sensor 12 is configured to monitor for orientation changes and specifically whether the orientation of the device changes to portrait orientation.

Figure 13:
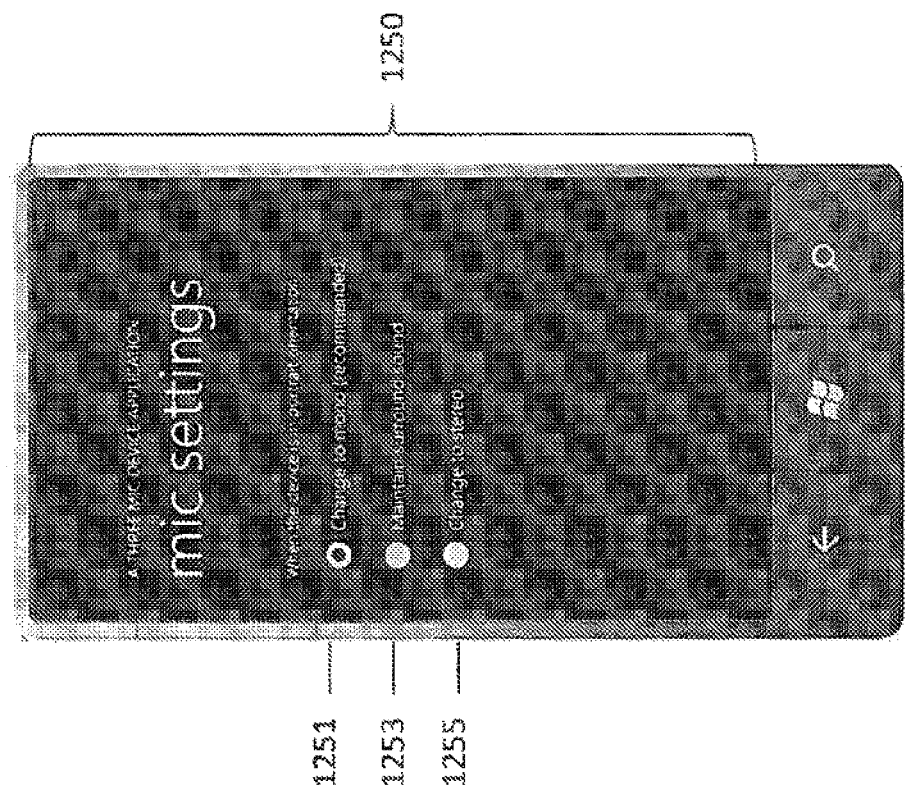
FIG. 13 shows schematically an example user interface settings output for a three microphone (3A) configuration as shown in FIG. 5.

The check or determination of whether the orientation changes to portrait is shown in FIG. 16 by step 1357.

Where the orientation is not changed the flow diagram loops back to step 1351 (the device remains in surround sound recording mode in landscape orientation.

Where the orientation changes to portrait the recording mode determiner checks the user interface input recording preference or in other words the user microphone settings. This can in some embodiments be an internal check of the settings or initiate the display to show the user interface output such as shown in FIG. 13 enabling the user to select whether the settings are to change to the recommended mono mode of recording or to fix the recording mode as stereo or surround sound modes.

The operation of checking or retrieving the microphone settings or recording mode preference is shown in FIG. 16 by step 1363.

In some embodiments the recording mode determiner 121 can be configured to check the settings as whether they indicated the mono recording in portrait orientation is the preferred option.

The operation of checking whether mono recording or capture when the apparatus or device is in portrait orientation or mode is shown in FIG. 16 by step 1365.

Where the settings show that mono recording in portrait mode is not selected then the recording mode determiner 121 can be configured to check the settings as whether they indicated the stereo recording in portrait orientation is the preferred option.

The operation of checking whether stereo recording or capture when the apparatus or device is in portrait orientation or mode is shown in FIG. 16 by step 1366.

Where the settings show that neither mono recording nor stereo recording are the preferred options the device is configured to operate to capture surround sound audio in portrait orientation. In other words the surround sound recording mode for portrait orientation parameters can be determined by the recording mode controller 123 and the Mic 1, Mic 3 and Mic 5 inputs received, processed and output to be recorded or output.

The operation of the device in portrait orientation capturing surround sound signals is shown in FIG. 16 by step 1353.

Where the settings show that stereo recording in portrait mode is the preferred option selected then the device is configured to operate to capture stereo audio in portrait orientation.

The recording mode controller 123 can be configured in some embodiments to get or determine microphone parameters for stereo recording. These can for example be digital signal processing parameters for selecting two of the microphones as the input.

The operation of getting or determining the microphone parameters for stereo recording is shown in FIG. 16 by step 1368.

In some embodiments the recording mode controller can use the user interface output such as the display 127 to optionally inform the user that stereo recording is being used.

The operation of informing the user that stereo capture use is in operation is shown in FIG. 16 by step 1370.

The recording mode controller 123 can then apply the parameters for stereo recording and therefore the device in portrait orientation is configured to capture or record stereo audio signals.

The operation of stereo recording in portrait orientation is shown in FIG. 16 by step 1372.

Where the settings show that mono recording in portrait mode is selected then the device is configured to operate to capture mono audio in portrait orientation.

The recording mode controller 123 can be configured in some embodiments to get or determine microphone parameters for mono recording. These can for example be digital signal processing parameters for selecting one of the three microphones as the input or mixing parameters for mixing the inputs.

The operation of getting or determining the microphone parameters for mono recording is shown in FIG. 16 by step 1367.

In some embodiments the recording mode controller can use the user interface output such as the display 127 to optionally inform the user that mono recording is being used.

The operation of informing the user that mono capture use is in operation is shown in FIG. 16 by step 1369.

The recording mode controller 123 can then apply the parameters for mono recording and therefore the device in portrait orientation is configured to capture or record mono audio signals.

The operation of mono recording in portrait orientation is shown in FIG. 16 by step 1355, As described herein the orientation sensor 12 is configured to monitor for orientation changes and whether the orientation of the device changes to landscape orientation from portrait.

The check or determination of whether the orientation changes from portrait to landscape is shown in FIG. 16 by step 1359 where the device is recording in surround sound as shown in step 1353, or by step 1361 where the device is recording in mono as shown in step 1355, or by step 1374 where the device is recording in stereo as shown in step 1372.

Where the determination does not detect a change to landscape then the device remains recording or capturing in surround as shown in step 1353 or in mono as shown in step 1355, or in stereo as shown in step 1372. However when a change to landscape is detected or determined then the recording mode determiner 121 can determine a change in recording mode, and the recording mode controller 123 can determine the surround sound (or in some cases stereo or mono) recording parameters and apply these such that the operation passes to step 1351 where the device is in landscape orientation capturing surround sound signals.

In some embodiments where the orientation sensor 12 detects or determines a change in the orientation from portrait to landscape the recording mode controller 123 can output to the user interface output display 127 an indication to the user that surround sound capture is being applied.

The operation of displaying to the user that stereo recording is being applied is shown in FIG. 16 by step 1362.

Figure 6:
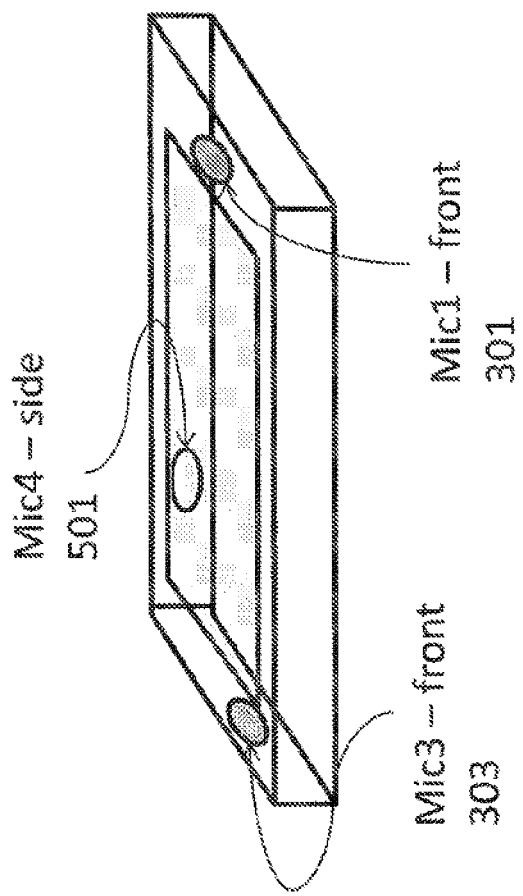
FIG. 6 shows schematically a second (3B) example three microphone configuration for a mobile device according to some embodiments.

A second 3-microphone apparatus configuration (configuration 3B) is shown in FIG. 6. The 3-microphone apparatus, (3B), features apparatus comprising a first microphone Mic 1 301 located on the front surface of the device, approximately left-right central, and located towards the bottom of the device or apparatus. Furthermore the apparatus comprises a second microphone Mic 3 303 also located on the front surface of the device or apparatus, located on the left side of the top of the device or apparatus and a third microphone Mic 4 501 located on the right-hand (side) surface 320 and located towards the top of the device (but not as close to the top edge as the second microphone Mic 3 303).

The location of the third microphone Mic 4 501 relative to the first and second microphones is such that when in landscape orientation the device or apparatus can record stereo sound using Mic 1 301 and Mic 3 303, stereo sound using Mic 1 301 and Mic 4 501, and when in portrait orientation also record stereo sound using Mic 3 303 and Mic 4 501.

A partial lookup table for the 3B configuration can thus be as follows:

| Apparatus orientation Input | Recording Mode Output | Microphone Selection/Combination | Priority |
| --- | --- | --- | --- |
| Portrait | Stereo | 3 + 4 | 1 |
| Portrait | Mono | 1 | 2 |
| Portrait | Mono | 3 | 3 |
| Portrait | Mono | 4 | 4 |
| Landscape | Stereo | 1 + 3 | 1 |
| Landscape | Stereo | 1 + 4 | 2 |
| Landscape | Mono | 1 | 3 |
| Landscape | Mono | 3 | 4 |
| Landscape | Mono | 4 | 5 |

In some embodiments as described herein the recording mode determiner 121 can be configured to use the input from the user interface input to influence the determination. However in the 3B configuration as both landscape and portrait orientations can record stereo the options provided can in some embodiments whether to record in stereo or mono.

Figure 7:
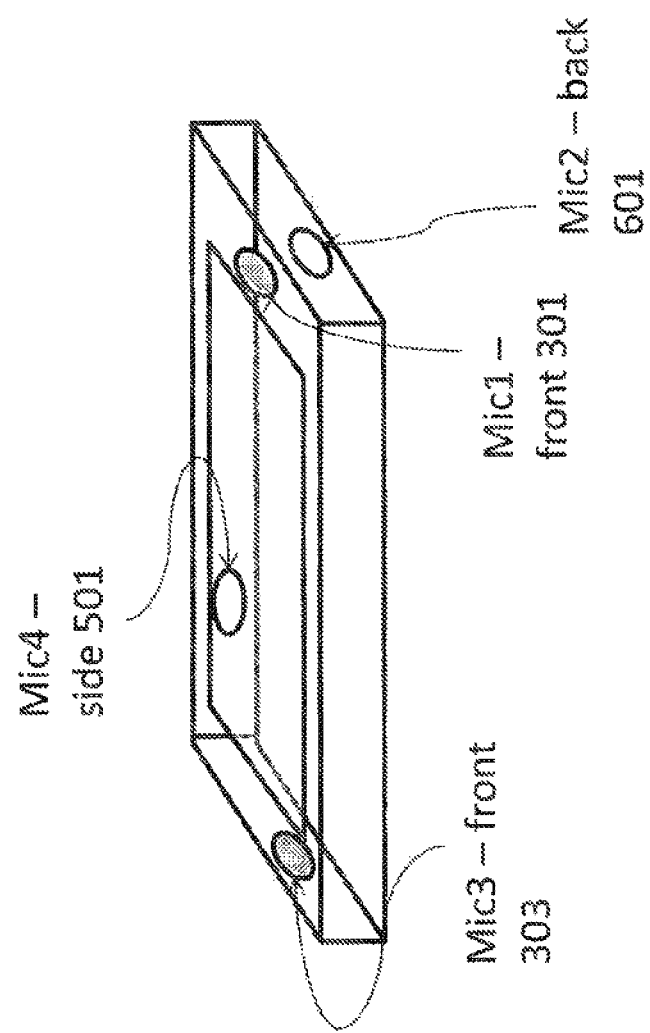
FIG. 7 shows schematically a first (4A) example four microphone configuration for a mobile device according to some embodiments.

With respect to FIG. 7 a first example 4-microphone configuration apparatus or device implementing embodiments as described herein is described in further detail. The 4-microphone apparatus, configuration A (4A), features apparatus comprising a first microphone Mic 1 301 located on the front surface of the device, approximately left-right central, and located towards the bottom of the device or apparatus. Furthermore the apparatus comprises a second microphone Mic 3 303 also located on the front surface of the device or apparatus, located on the left side of the top of the device or apparatus. The apparatus further comprises a third microphone Mic 2 601 located on the rear or back surface of the apparatus (opposite the first microphone Mic 1 301) and a fourth microphone Mic 4 501 located on the right-hand (side) surface 320 and located towards the top of the device (but not as close to the top edge as the second microphone Mic 3 303).

The location of the third and fourth microphones Mic 2 601 and Mic 4 501 relative to the first and second microphones is such that when in landscape orientation the device or apparatus can record surround sound using Mic 1 301, Mic 2 601 and Mic 3 303, stereo sound using Mic 1 301 and Mic 3 303, or Mic 2 601 and Mic 3 303 and when in portrait orientation also record stereo sound using Mic 3 303 and Mic 4 501.

A partial lookup table for the 4A configuration can thus be as follows:

| Apparatus orientation Input | Recording Mode Output | Microphone Selection/Combination | Priority |
| --- | --- | --- | --- |
| Portrait | Stereo | 3 + 4 | 1 |
| Portrait | Mono | 1 | 1 |
| Portrait | Mono | 2 | 2 |
| Portrait | Mono | 3 | 3 |
| Portrait | Mono | 4 | 4 |
| Landscape | Surround | 1 + 2 + 3 | 1 |
| Landscape | Stereo | 1 + 3 | 1 |
| Landscape | Stereo | 2 + 3 | 2 |
| Landscape | Mono | 1 | 1 |
| Landscape | Mono | 2 | 2 |
| Landscape | Mono | 3 | 3 |
| Landscape | Mono | 4 | 4 |

In some embodiments as described herein the recording mode determiner 121 can be configured to use the input from the user interface input to influence the determination. For example with respect to FIG. 14 a user interface preference display image is shown which can be used to provide a suitable input to the recording mode determiner with respect to selecting whether the portrait orientation recording mode preference is surround sound or stereo recording.

The user interface display 1200 comprises two radio buttons, a first 'change to stereo' radio button 1201 which is set as the default option for the reasons as indicated herein and a second 'maintain surround sound' radio button 1203. The recording mode determiner 121 can in such embodiments when portrait orientation is determined by the orientation sensor 12 use the user interface input to select whether the recording mode is stereo or surround sound, In other words recording mode determiner can apply an example partial look up table such as the following:

| Apparatus orientation Input | User Interface Recording Preference Input | Recording Mode Output | Microphone Selection/Combination | Priority |
|---|---|---|---|---|
| Portrait | Change to stereo | Stereo | 3 + 4 | 1 |
| Portrait | Maint. Surround | Surround Sound | 1 + 2 + 3 | 1 |

Figure 17:
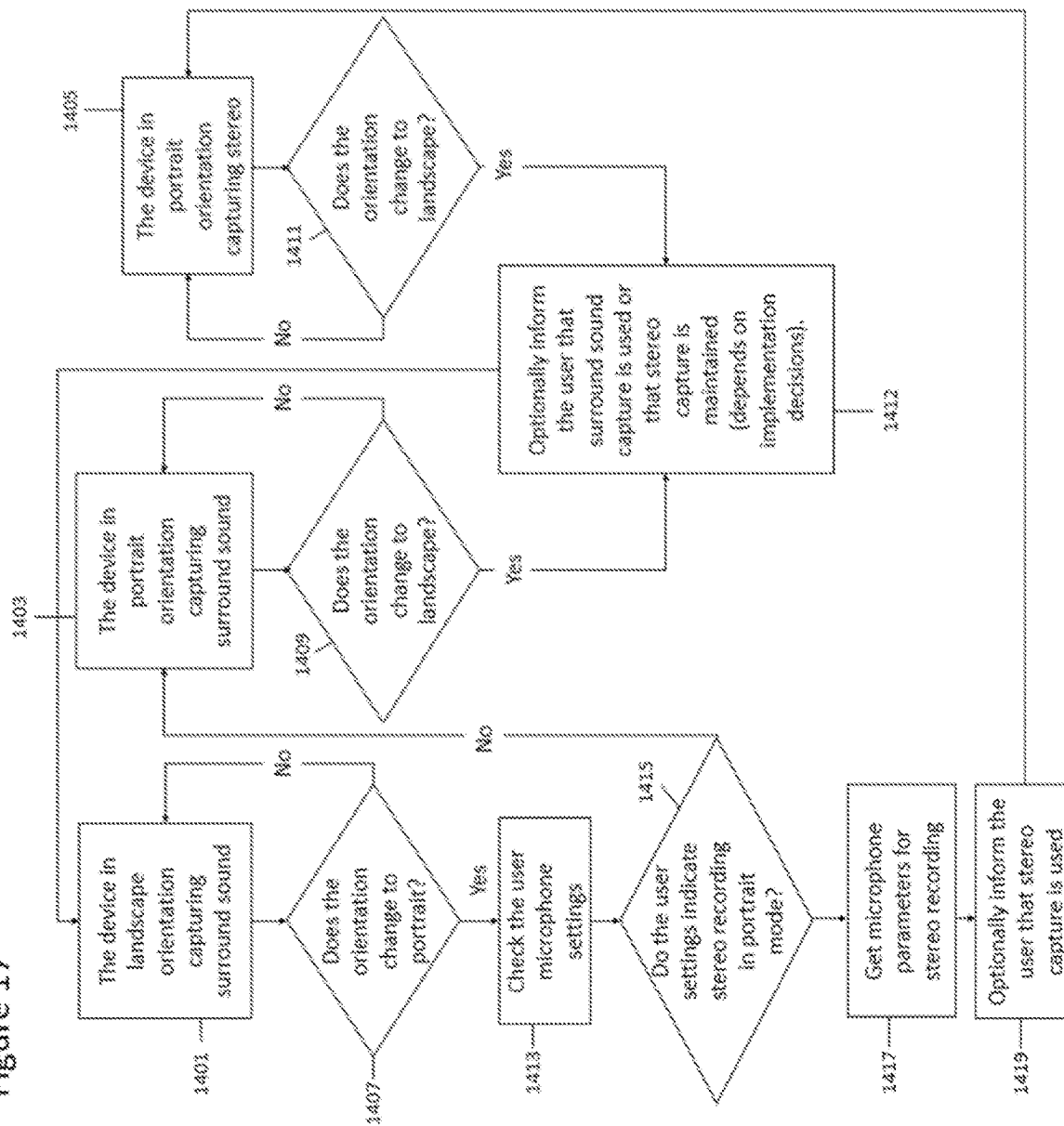
FIG. 17 shows an example flow diagram of the operating mode setting logic for a four microphone (4A) configuration as shown in FIG. 7.

FIG. 17 furthermore shows a flow diagram of the operating modes or setting logic for a 4-microphone configuration as shown in FIG. 7 and using user input.

In the following example the apparatus or device is recording or capturing a surround sound signal while in landscape orientation, The step of the device being in landscape orientation capturing surround sound is shown in FIG. 17 by step 1401.

As described herein the orientation sensor 12 is configured to monitor for orientation changes and specifically whether the orientation of the device changes to portrait orientation.

The check or determination of whether the orientation changes to portrait is shown in FIG. 17 by step 1407.

Where the orientation is not changed the flow diagram loops back to step 1401 (the device remains in surround sound recording mode in landscape orientation.

Where the orientation changes to portrait the recording mode determiner checks the user interface input recording preference or in other words the user microphone settings. This can in some embodiments be an internal check of the settings or initiate the display to show the user interface output such as shown in FIG. 12 enabling the user to select whether the settings are to remain as the recommended stereo mode of recording or to fix the recording mode as a surround sound recording mode.

The operation of checking or retrieving the microphone settings or recording mode preference is shown in FIG. 17 by step 1413.

In some embodiments the recording mode determiner 121 can be configured to check the settings as whether they indicated the stereo recording in portrait orientation is the preferred option.

The operation of checking whether stereo recording (or capture) when the apparatus (or device) is in portrait orientation (or mode) is shown in FIG. 17 by step 1415.

Where the settings show that stereo recording in portrait mode is not selected then device is configured to operate to capture surround sound audio in portrait orientation. In other words the surround sound recording mode for portrait orientation parameters can be determined by the recording mode controller 123 and the Mic 1, Mic 2 and Mic 3 inputs (or in some embodiments Mic 1, Mic 3 and Mic 4 inputs) are received, processed and output to be recorded or output.

The operation of the device in portrait orientation capturing surround sound signals is shown in FIG. 17 by step 1403.

Where the settings show that stereo recording in portrait mode is selected then the device is configured to operate to capture stereo audio in portrait orientation.

The recording mode controller 123 can be configured in some embodiments to get or determine microphone parameters for stereo recording. These can for example be digital signal processing parameters for selecting one pair of the microphones as the input or mixing parameters for mixing the inputs.

The operation of getting or determining the microphone parameters for stereo recording is shown in FIG. 17 by step 1417.

In some embodiments the recording mode controller can use the user interface output such as the display 127 to optionally inform the user that stereo recording is being used.

The operation of informing the user that stereo capture use is in operation is shown in FIG. 17 by step 1419.

The recording mode controller 123 can then apply the parameters for stereo recording and therefore the device in portrait orientation is configured to capture or record stereo audio signals.

The operation of stereo recording in portrait orientation is shown in FIG. 17 by step 1405.

As described herein the orientation sensor 12 is configured to monitor for orientation changes and whether the orientation of the device changes to landscape orientation from portrait.

The check or determination of whether the orientation changes from portrait to landscape is shown in FIG. 17 by step 1409 where the device is recording in surround sound as shown in step 1403, or by step 1411 where the device is recording in stereo as shown in step 1405.

Where the determination does not detect a change to landscape then the device remains recording or capturing in surround sound as shown in step 1403 or in stereo as shown in step 1405: However when a change to landscape is detected or determined then the recording mode determiner 121 can determine a change in recording mode, and the recording mode controller 123 can determine the surround sound (or in some cases stereo or mono) recording parameters and apply these such that the operation passes to step 1401 where the device is in landscape orientation capturing surround sound signals.

In some embodiments where the orientation sensor 12 detects or determines a change in the orientation from portrait to landscape the recording mode controller 123 can output to the user interface output display 127 an indication to the user that surround sound capture is being applied.

The operation of displaying to the user that surround sound recording is being applied is shown in FIG. 17 by step 1412.

Figure 8:
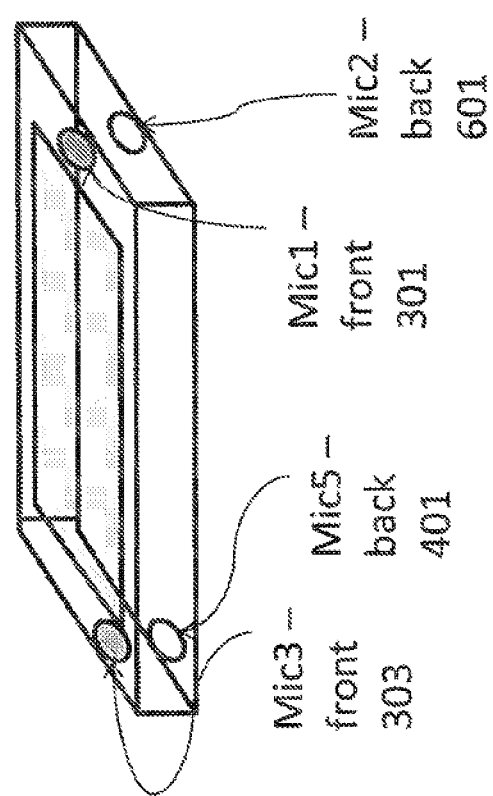
FIG. 8 shows schematically a second (4B) example four microphone configuration for a mobile device according to some embodiments.

With respect to FIG. 8 a second 4-microphone apparatus configuration (configuration 4B) is shown where the apparatus comprises a first microphone Mic 1 301 located on the front surface of the device, approximately left-right central, and located towards the bottom of the device or apparatus. Furthermore the apparatus comprises a second microphone Mic 3 303 also located on the front surface of the device or apparatus, located on the left side of the top of the device or apparatus. Furthermore the apparatus comprises a third microphone Mic 2 601 located on the rear or back surface of the apparatus (opposite the first microphone Mic 1 301) and a fourth microphone Mic 5 401 located on the rear or back surface of the apparatus (opposite the second microphone Mic 3 303).

The configuration of the microphones is such that when in landscape orientation the configuration of the apparatus enables surround sound recording using any combination of Mic 1 301, Mic 2 601, Mic 3 303, and Mic 5 401 or stereo signal using Mic 1 301 or Mic 2 601 and either Mic 3 303 or Mic 5 401 and when in portrait orientation enables mono recording using any of Mic 1 301, Mic 2 601, Mic 3 303 or Mic 5 401.

This apparatus or device can thus comprise a recording mode determiner which uses the following partially complete look-up table, where the priority column indicates the priority of the recording mode and/or microphone selection for the orientation input.

In some embodiments as described herein the recording mode determiner 121 can be configured to use the input from the user interface input to influence the determination. For example a user interface preference display image such as shown in FIG. 14 could be used which can be used to provide a suitable input to the recording mode determiner with the option of mono being preferred over stereo or surround sound.

Figure 9:
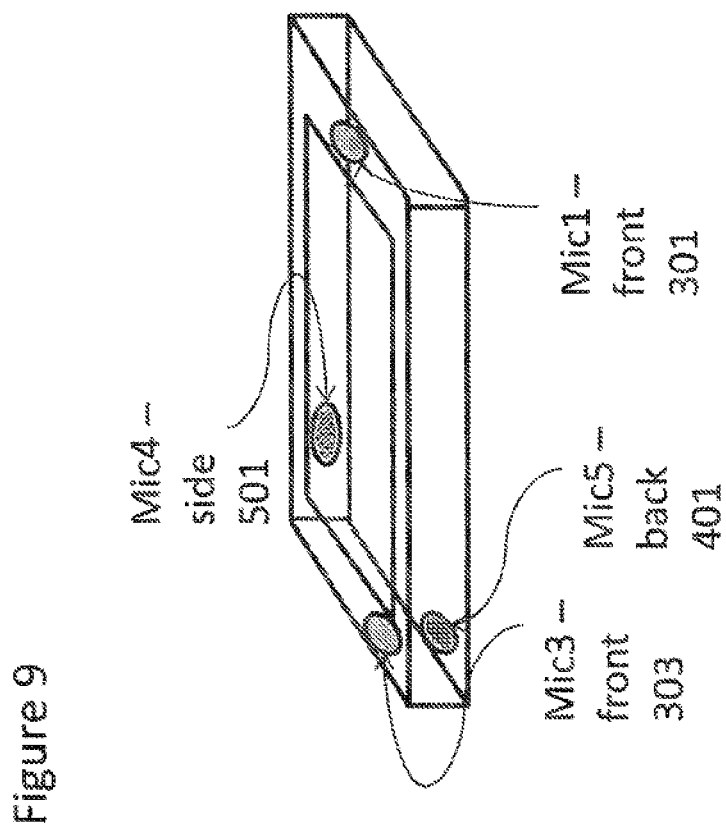
FIG. 9 shows schematically a third (4C) example four microphone configuration for a mobile device according to some embodiments.

With respect to FIG. 9 a third 4-microphone configuration apparatus or device implementing embodiments as described herein is described in further detail. The 4-microphone apparatus, configuration C (4C), features apparatus comprising a first microphone Mic 1 301 located on the front surface of the device, approximately left-right central, and located towards the bottom of the device or apparatus. Furthermore the apparatus comprises a second microphone Mic 3 303 also located on the front surface of the device or apparatus, located on the left side of the top of the device or apparatus. The apparatus further comprises a third microphone Mic 5 401 located on the rear or back surface of the apparatus (opposite the second microphone Mic 3 303) and a fourth microphone Mic 4 501 located on the right-hand (side) surface 320 and located towards the top of the device (but not as close to the top edge as the second microphone Mic 3 303).

The location of the third and fourth microphones Mic 5 401 and Mic 4 501 relative to the first and second microphones is such that when in landscape orientation the device or apparatus can record surround sound using Mic 1 301, Mic 3 303 and Mic 5 401, stereo sound using Mic 1 301 and Mic 3 303, or Mic 1 301 and Mic 5 401 and when in portrait orientation record surround sound using Mic 3 303, Mic 4 501 and Mic 5 401 and also record stereo sound using Mic 3 303 and Mic 4 501 or Mic 5 401 and Mic 4 501.

A partial lookup table for the 4C configuration can thus be as follows (the following partial lookup tables have dropped the mono recording mode output entries to reduce the number of rows but would be understood as being found in some embodiments in the full lookup table):

| Apparatus orientation Input | Recording Mode Output | Microphone Selection/Combination | Priority |
| --- | --- | --- | --- |
| Portrait | Surround | 3 + 4 + 5 | 1 |
| Portrait | Stereo | 3 + 4 | 1 |
| Portrait | Stereo | 5 + 4 | 2 |
| ... | ... | ... | ... |
| Landscape | Surround | 1 + 3 + 5 | 1 |
| Landscape | Stereo | 1 + 3 | 1 |
| Landscape | Stereo | 1 + 5 | 2 |
| ... | ... | ... | ... |

In some embodiments as described herein the recording mode determiner 121 can be configured to use the input from the user interface input to influence the determination. However in the 40 configuration, as both landscape and portrait orientations can record surround sound, the default option provided can in some embodiments be surround sound with the further option to select to record in stereo or mono.

Figure 10:
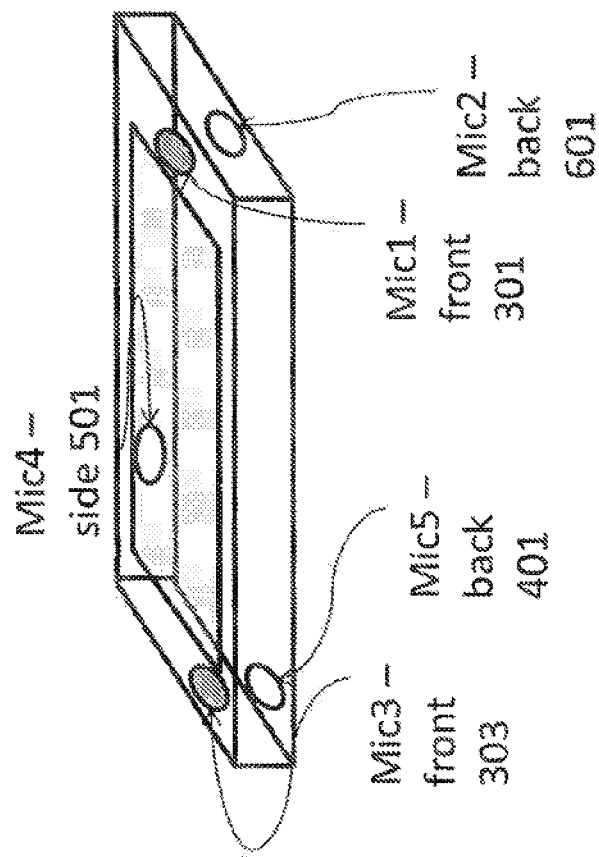
FIG. 10 shows schematically an example five microphone configuration for a mobile device according to some embodiments.

With respect to FIG. 10 an example 5-microphone configuration apparatus or device implementing embodiments as described herein is described in further detail. The 5-microphone apparatus features apparatus comprising a first microphone Mic 1 301 located on the front surface of the device, approximately left-right central, and located towards the bottom of the device or apparatus. Furthermore the apparatus comprises a second microphone Mic 3 303 also located on the front surface of the device or apparatus, located on the left side of the top of the device or apparatus. The apparatus further comprises a third microphone Mic 2 601 located on the rear or back surface of the apparatus (opposite the first microphone Mic 1 301), a fourth microphone Mic 5 401 located on the rear or back surface of the apparatus (opposite the second microphone Mic 3 303, and a fifth microphone Mic 4 601 located on the right-hand (side) surface 320 and located towards the top of the device (but not as close to the top edge as the second microphone Mic 3 303).

The configuration of the microphones is such that when in landscape orientation the configuration of the apparatus enables surround sound recording using any suitable combination of Mic 1 301, Mic 2 601, Mic 3 303, and Mic 5 401 or stereo signal using Mic 1 301 or Mic 2 601 and Mic 3 303 or Mic 5 401 and when in portrait orientation enables surround sound recording using Mic 3 303, Mic 4 501 and Mic 5 401 and stereo using Mic 3 303 and Mic 4 501 or Mic 5 401 and Mic 4 501.

This apparatus or device can thus comprise a recording mode determiner which uses the following partially complete look-up table, where the priority column indicates the priority of the recording mode and/or microphone selection for the orientation input.

| Apparatus orientation Input | Recording Mode Output | Microphone Selection/Combination | Priority |
| --- | --- | --- | --- |
| Portrait | Surround | 3 + 4 + 5 | 1 |
| Portrait | Stereo | 3 + 4 | 1 |
| Portrait | Stereo | 5 + 4 | 2 |
| Portrait | Mono | 1 | 1 |
| Portrait | Mono | 2 | 2 |
| ... | ... | ... | ... |
| Landscape | Surround | 1 + 3 + 5 | 1 |
| Landscape | Surround | 1 + 2 + 5 | 2 |
| ... | ... | ... | ... |
| Landscape | Stereo | 1 + 3 | 1 |
| Landscape | Stereo | 1 + 5 | 2 |
| ... | ... | ... | ... |
| Landscape | Mono | 1 | 1 |
| Landscape | Mono | 2 | 2 |
| ... | ... | ... | ... |

In some embodiments as described herein the recording mode determiner 121 can be configured to use the input from the user interface input to influence the determination. However in the 5-microphone configuration, as both landscape and portrait orientations can record surround sound, the default option provided can in some embodiments be surround sound with the further option to select to record in stereo or mono.

Figure 11:
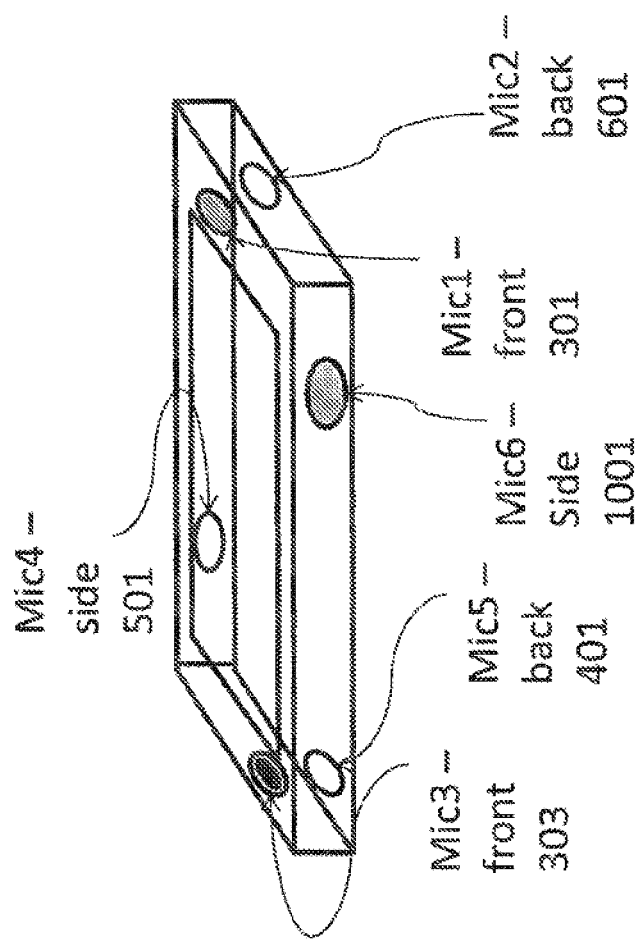
FIG. 11 shows schematically an example six microphone configuration for a mobile device according to some embodiments.

With respect to FIG. 11 an example 6-microphone configuration apparatus or device implementing embodiments as described herein is described in further detail. The 6-microphone apparatus features apparatus comprising a first microphone Mic 1 301 located on the front surface of the device, and approximately to the right of the central line, and located towards the bottom of the device or apparatus. Furthermore the apparatus comprises a second microphone Mic 3 303 also located on the front surface of the device or apparatus, located on the left side of the top of the device or apparatus. The apparatus further comprises a third microphone Mic 2 601 located on the rear or back surface of the apparatus (opposite the first microphone Mic 1 301), a fourth microphone Mic 5 401 located on the rear or back surface of the apparatus (opposite the second microphone Mic 3 303, a fifth microphone Mic 4 501 located on the right-hand (side) surface 320 and located towards the top of the device (but not as close to the top edge as the second microphone Mic 3 303), and a sixth microphone Mic 6 1001 located on the left-hand (side) surface 318 and located towards the bottom of the device (but not as dose to the bottom edge as the second microphone Mic 1 301).

In some embodiments the configuration as shown in FIG. 11 shows that the microphones are configured with 180 degree rotational symmetry through the front and rear surfaces. In other words the placing the device rear or front surface on a table and rotating the device 180 degrees would produce an identical microphone configuration.

The configuration of the microphones is such that when in landscape orientation the configuration of the apparatus enables surround sound recording using any suitable combination of Mic 1 301, Mic 2 601, Mic 3 303, and Mic 5 401 or stereo signal using Mic 1 301 or Mic 2 601 and Mic 3 303 or Mic 5 401. When in portrait up orientation the configuration of the microphones enables surround sound recording using Mic 3 303, Mic 4 501 and Mic 5 401 and stereo using Mic 3 303 and Mic 4 501 or Mic 5 401 and Mic 4 501. Furthermore when in portrait down orientation the configuration of the microphones enables surround sound recording using Mic 1 301, Mic 2 601 and Mic 6 1001 and stereo using Mc 1 301 and Mic 6 1001 or Mic 2 601 and Mic 6 1001.

This apparatus or device can thus comprise a recording mode determiner which uses the following partially complete look-up table where orientation is now defined with respect to landscape, portrait with device top directed upwards, and portrait with device top directed downwards, and where the priority column indicates the priority of the recording mode and/or microphone selection for the orientation input.

| Apparatus orientation Input | Recording Mode Output | Microphone Selection/Combination | Priority |
| --- | --- | --- | --- |
| Portrait-u | Surround | 3 + 4 + 5 | 1 |
| Portrait-u | Stereo | 3 + 4 | 1 |
| Portrait-u | Stereo | 5 + 4 | 2 |
| Portrait-u | Mono | 1 | 1 |
| Portrait-u | Mono | 2 | 2 |
| . . . | . . . | . . . | . . . |
| Portrait-d | Surround | 1 + 2 + 6 | 1 |
| Portrait-d | Stereo | 1 + 6 | 1 |
| Portrait-d | Stereo | 2 + 6 | 2 |
| Portrait-d | Mono | 1 | 1 |
| Portrait-d | Mono | 2 | 2 |
| . . . | . . . | . . . | . . . |
| Landscape | Surround | 1 + 3 + 5 | 1 |
| Landscape | Surround | 1 + 2 + 5 | 2 |
| . . . | . . . | . . . | . . . |
| Landscape | Stereo | 1 + 3 | 1 |
| Landscape | Stereo | 1 + 5 | 2 |
| . . . | . . . | . . . | . . . |
| Landscape | Mono | 1 | 1 |
| Landscape | Mono | 2 | 2 |
| . . . | . . . | . . . | . . . |

In some embodiments as described herein the recording mode determiner 121 can be configured to use the input from the user interface input to influence the determination. However in the 6-microphone configuration, as both landscape and both portrait orientations can record surround sound, the default option provided can in some embodiments be surround sound with the further option to select to record in stereo or mono.

In some embodiments the apparatus or device can be configured to perform dual track audio recording or capture. Thus for example in a 2-microphone configuration apparatus, such as shown in FIG. 4, a first track can be recorded as a stereo recording. In some embodiments the stereo signal may be encoded as an Advanced Audio Coding (AAC) format. Furthermore the second track can record a mono or mixed mono track. In some embodiments the first track can be recorded as a stereo/AAC format signal when the device is portrait orientated or when the recording mode is switched to mono recording the first track output can be double (or dual) mono (in other words a mono channel recording from either of the two microphones duplicated to the other channel).

Figure 18:
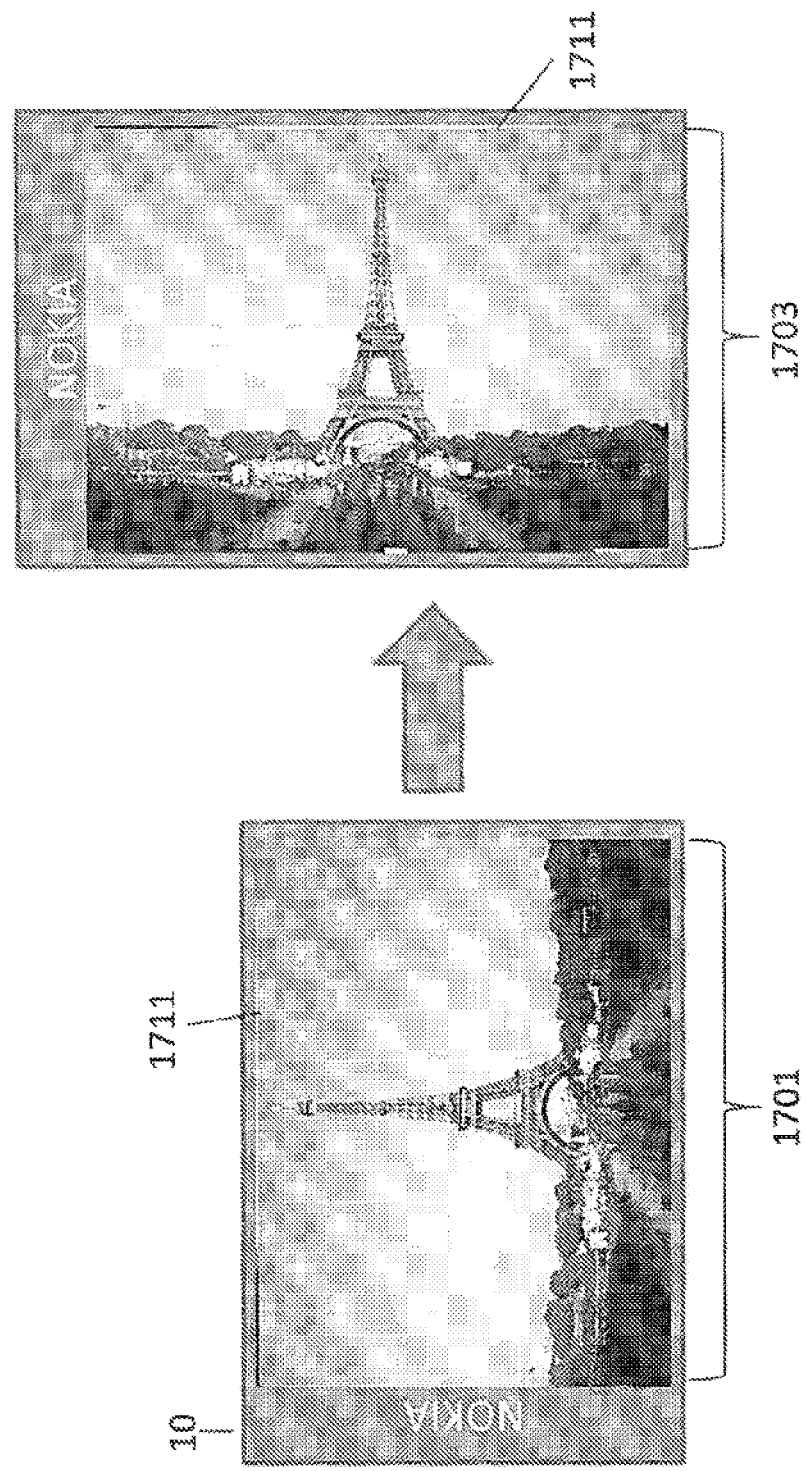
FIGS. 18 and 19 show example device user interface orientation and user interface outputs according to some embodiments.
Figure 19:
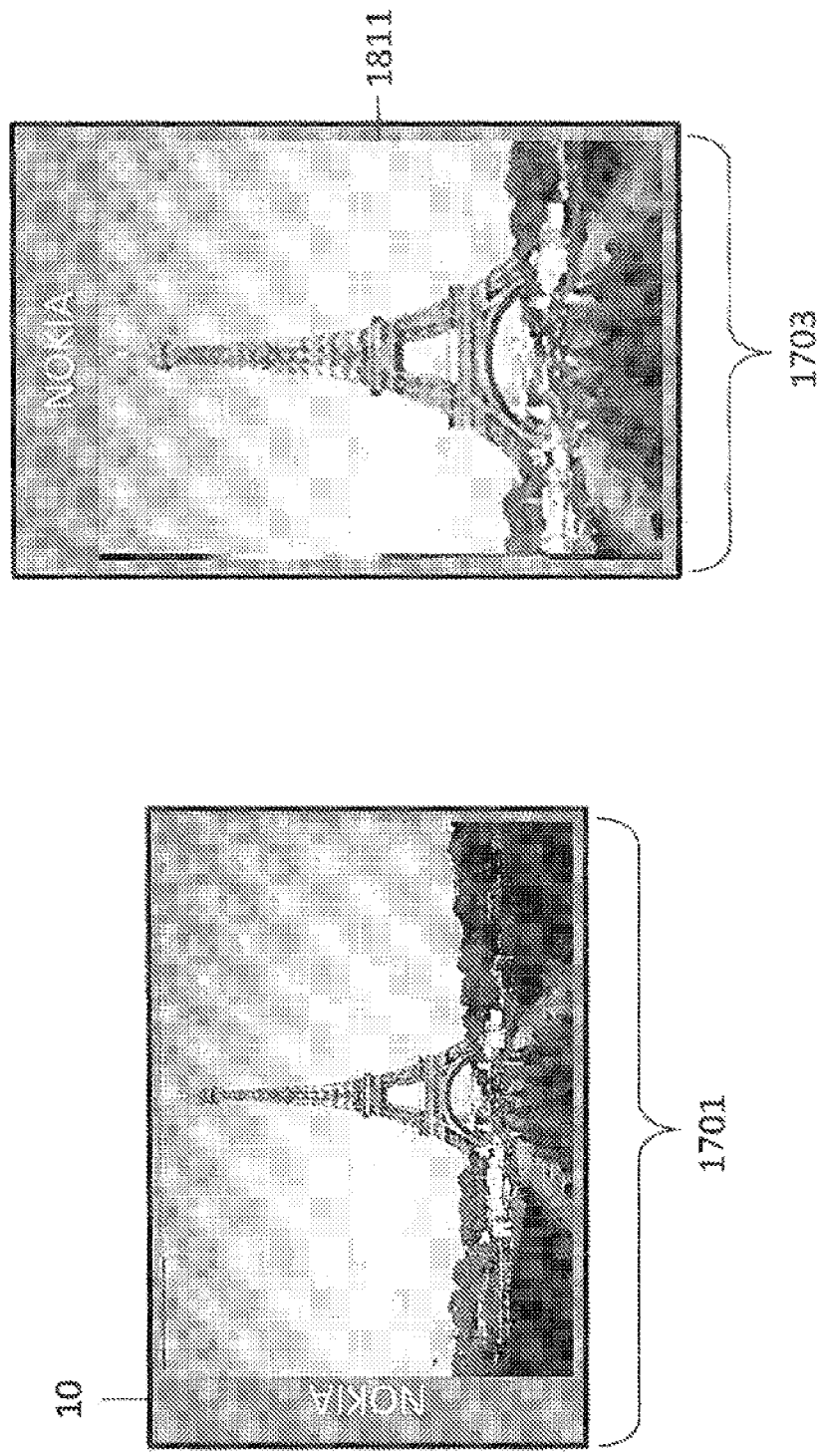

With respect to FIGS. 18 and 19 the operation of change of orientation with respect to video recording is shown. For example the typical operation of the apparatus or device is such that during video recording where the orientation of the apparatus or device is changed during recording, the video is rotated accordingly. Thus as shown in FIGS. 19 and 18 the apparatus 10 when recording while in a landscape orientation 1701 produces a landscape ratio image 1711. When the apparatus changes orientation to portrait orientation 1703 the video track is typically following the orientation change and the image records in portrait mode 1811 such as shown in FIG. 19 rather than as shown in FIG. 18 maintaining a landscape recording mode 1711.

With respect to FIG. 20 an example microphone configuration is shown in both landscape and portrait orientation. The microphone configuration as shown in FIG. 20 is a three microphone configuration with a bottom front central microphone 1905 (in portrait orientation, right front central in landscape orientation), a top front central microphone 1903 (in portrait orientation, left front central in landscape orientation) and a top back central microphone 1901 (in portrait orientation, left back central in landscape orientation). It would be understood that such a configuration enables in landscape orientation surround sound capture or recording as there is sufficient (left-right separation between microphones), but in portrait there is no significant (left-right) separation to enable surround sound recording or even stereo recording.

In some embodiments where the settings (for example the user settings as described herein or the predefined or defined settings stored in the apparatus) indicate that in portrait orientation the device should change to mono recording, the switching between recording modes due to orientation change from landscape to portrait can be performed by ending the previous audio track (a surround sound track) and starting a new track (a mono sound track). This can be visualized with respect to FIG. 22 where a video track 2101 is recorded and while the apparatus is operating in landscape mode a surround sound track 2103 is also being recorded. When the event of orientation change from landscape to portrait is detected 2110 then the surround sound track 2103 is ended and the new mono track 2105 started. This track change can technically be achieved for example using a MP4 file format by using a Edit List Box.

Figure 23:
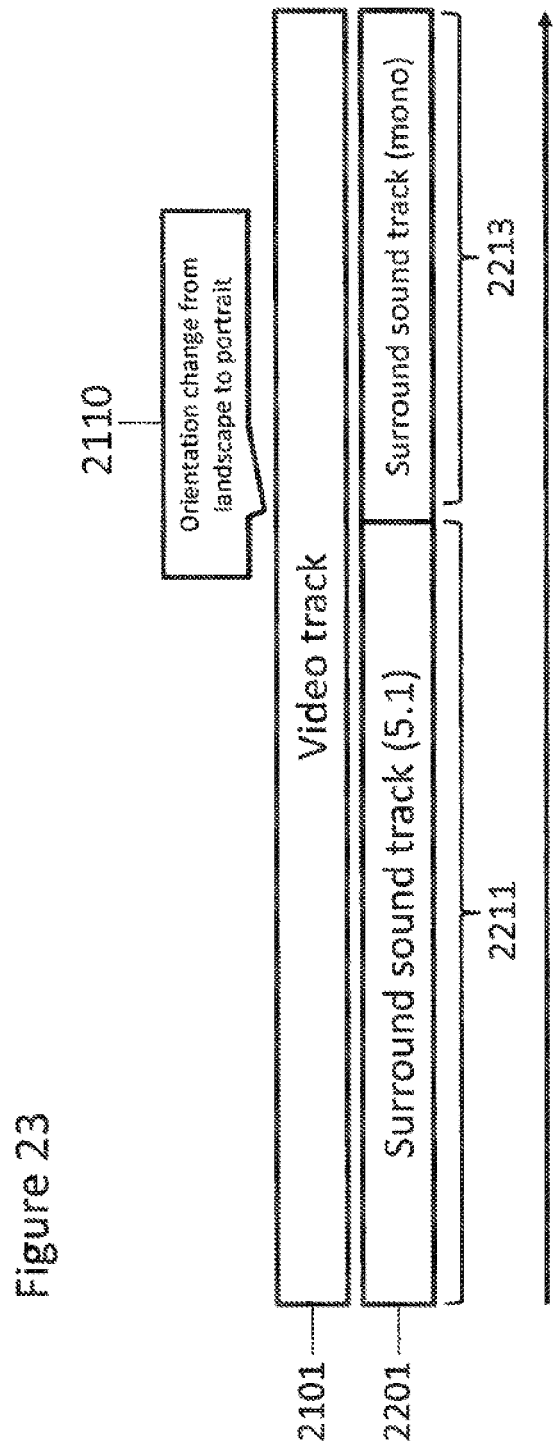

With respect to FIG. 23 a further example track arrangement is shown for a similar apparatus 3-microphone configuration. In some embodiments where the settings (for example the user settings as described herein or the predefined or defined settings stored in the apparatus) indicating that in portrait orientation the device should change to mono recording due to orientation change from landscape to portrait can implement this change by using one of the microphones (used in the landscape orientation with the other two microphones to record the surround sound track) to record a mono track and generate a surround sound track upmixed from the mono source. For example as shown in FIG. 23 where a video track 2101 is recorded and while the apparatus is operating in landscape mode a surround sound track 2201 is output with for example a 5.1 track 2211 output. When the event of orientation change from landscape to portrait is detected 2110 then the surround sound 5.1 track 2211 output converts into the surround sound track upmixed from the mono source 2213. In this example there is one audio track, however it would be understood that there could be more than one audio track being recorded.

Figure 22:
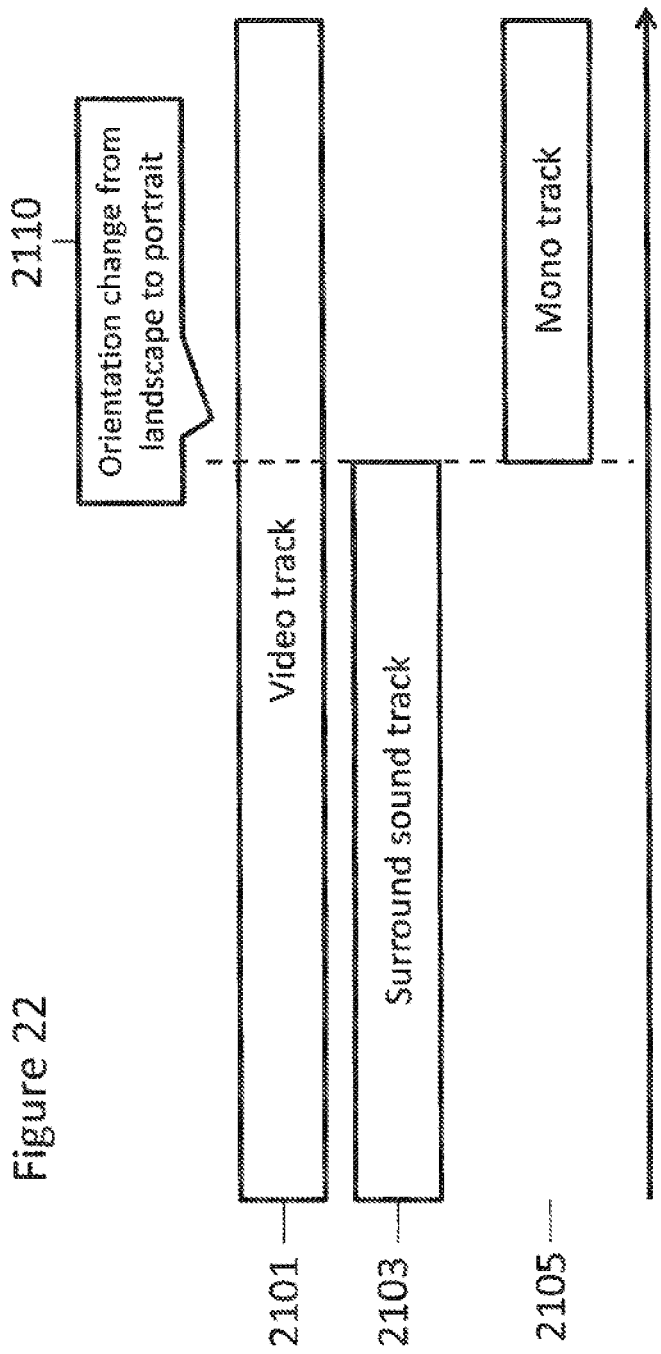
FIGS. 22, 23, 24, and 25 show example audio track change timelines according to some embodiments for a 3-microphone configuration as shown in FIG. 20.
Figure 24:
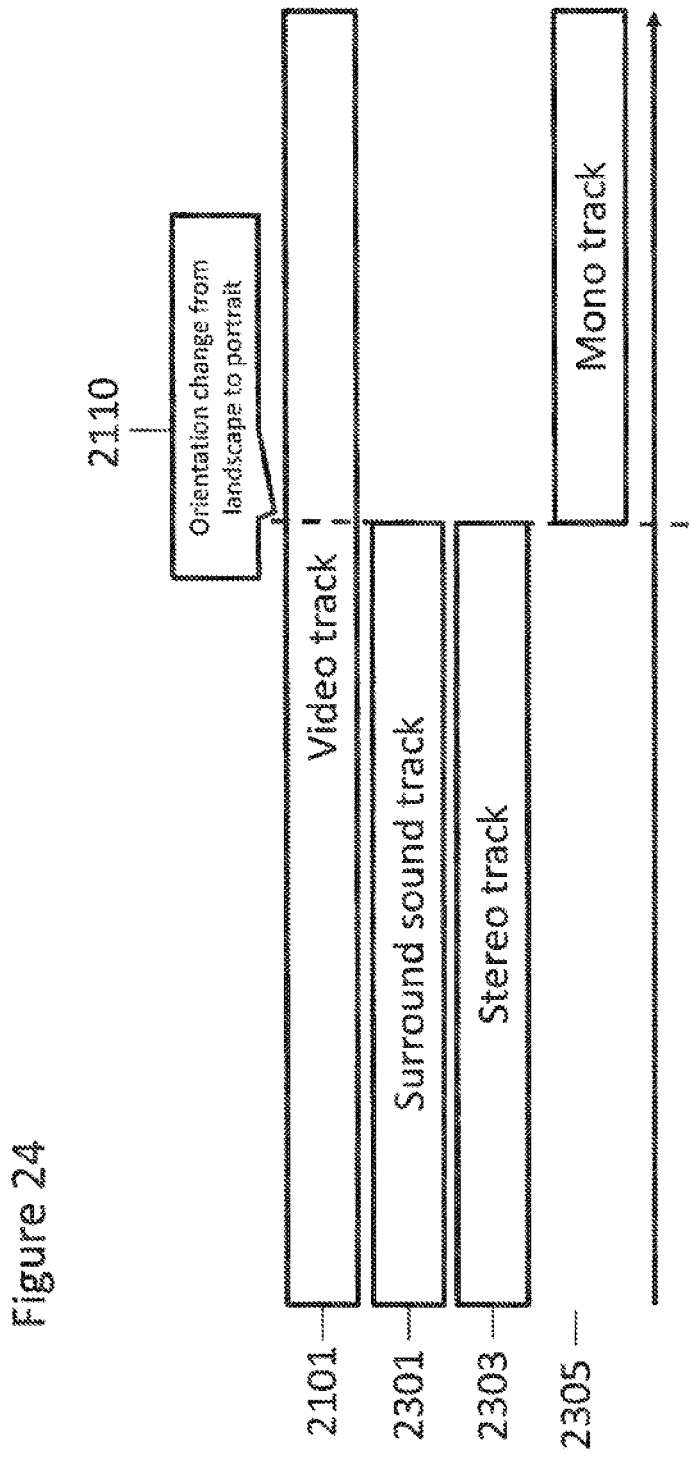

With respect to FIG. 24 a multiple track extension of the example track arrangement shown in FIG. 22 for a similar apparatus 3-microphone configuration is shown. In this example the settings (for example the user settings as described herein or the predefined or defined settings stored in the apparatus) indicate that in portrait orientation the device should change to mono recording when switching between recording modes due to orientation change from landscape to portrait. This change can be implemented by ending the previous audio >1 channel tracks (such as a surround sound track, or stereo track) and starting a new mono track. This can be visualized with respect to FIG. 24 where a video track 2101 is recorded and while the apparatus is operating in landscape mode a surround sound track 2301 and stereo track 2303 are being recorded. When the event of orientation change from landscape to portrait is detected 2110 then the surround sound track 2301 and the stereo track 2303 are ended and a new mono track 2305 started. This track change can technically be achieved as described herein for example by using a MP4 file format by using a Edit List Box.

Figure 25:
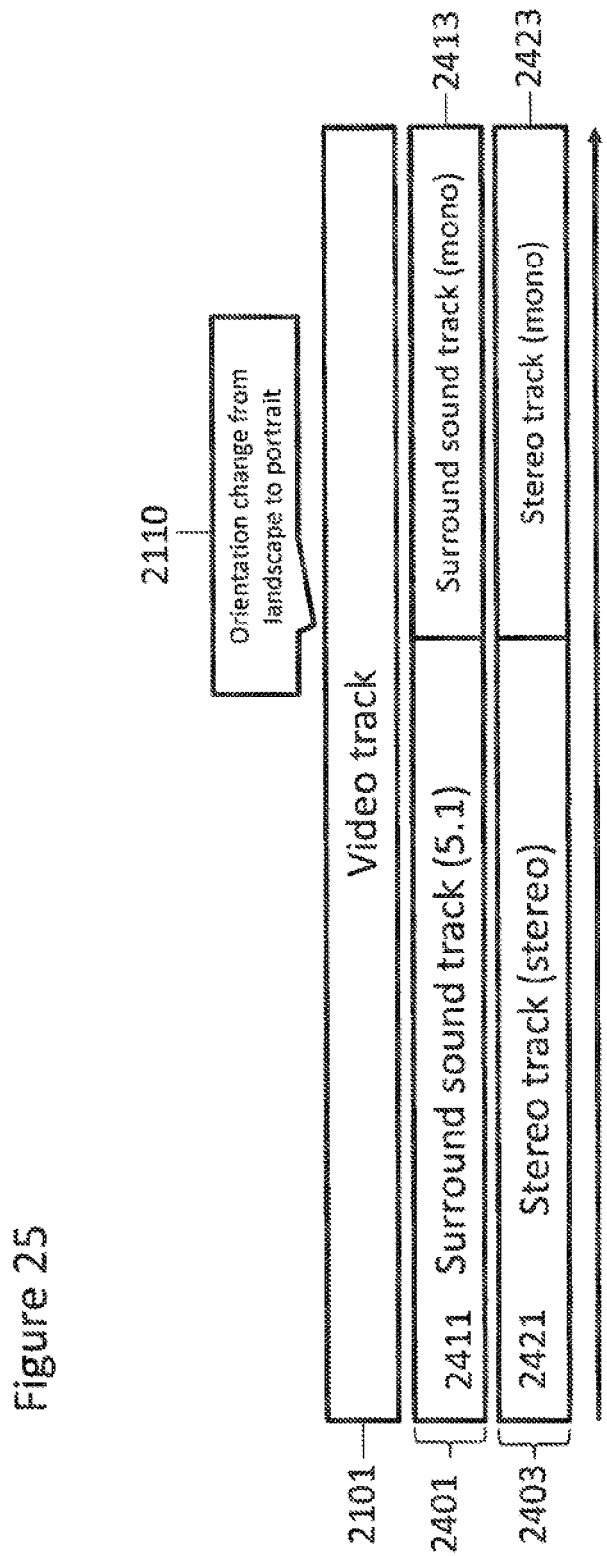

With respect to FIG. 25 an multiple track extension of the example track arrangement shown in FIG. 23 for a similar apparatus 3-microphone configuration is shown. In such an example the settings define that in portrait orientation the device should change to mono recording due to orientation change from landscape to portrait. This change can be implemented by using one of the microphones (used in the landscape orientation with the other two microphones to record the surround sound track or stereo track) to record a mono track and generate the output channels by upmixing the mono source. For example as shown in FIG. 25 where a video track 2101 is recorded and while the apparatus is operating in landscape mode a surround sound track 2401 is output with for example a 5.1 track 2411 output. When the event of orientation change from landscape to portrait is detected 2110 then the surround sound 5.1 track 2411 output converts into the surround sound output upmixed mono source 2413, Similarly when operating in landscape mode a stereo track 2403 is output with a full stereo track 2421 output. When the event of orientation change from landscape to portrait is detected 2110 then the full or real stereo track 2421 output converts into a stereo output from the upmixed mono source 2423.

With respect to FIG. 21 an example 4-microphone configuration is shown in landscape. The microphone configuration as shown in FIG. 21 is a four microphone configuration with a right front central microphone 2005 in landscape orientation (bottom front central in portrait orientation), a right back central microphone 2007 in landscape orientation (bottom back central microphone in portrait orientation), a left'ish front top microphone 2003 (top'ish, front, right microphone in portrait orientation) and a left, front bottom'ish microphone 2001 (top, front, left'ish microphone in portrait orientation). It would be understood that such a configuration enables in landscape orientation surround sound and stereo capture or recording as there is sufficient (left-right separation between microphones), and in portrait there is separation to enable stereo but not surround sound recording.

Figure 26:
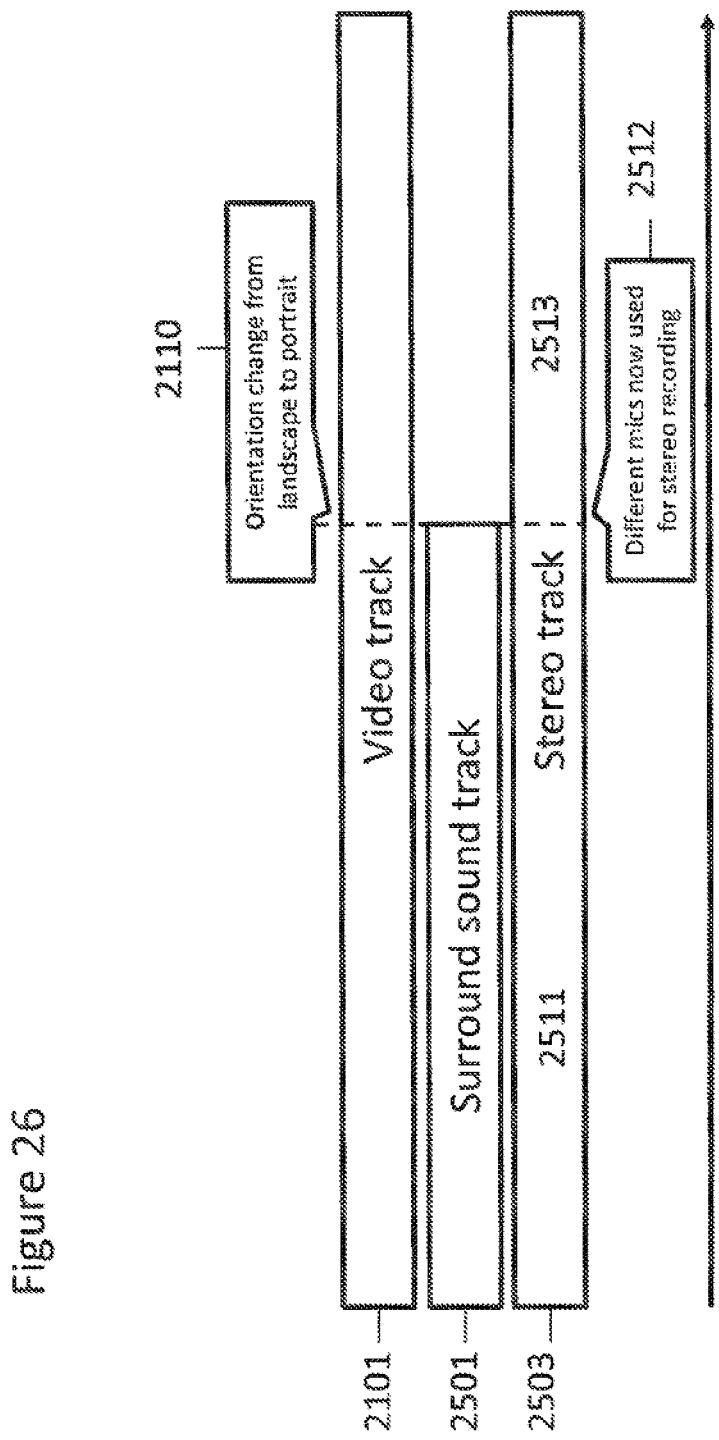
FIG. 26 shows an example audio track change timeline according to some embodiments for a 4-microphone configuration as shown in FIG. 21.

With respect to FIG. 26 an example track arrangement is shown for the apparatus 4-microphone configuration where the settings indicate that in portrait orientation the device should change microphones in stereo recording and stop surround sound recording (and in some embodiments enable 'stereo' recording upmixed from mono or mono source recordings similar to the operations shown in FIGS. 22 and 23). For example as shown in FIG. 26 where a video track 2101 is recorded and while the apparatus is operating in landscape mode a surround sound track 2501 is output and a stereo track 2503 is output using a first combination of microphones (shown as configuration 2511). When the event of orientation change from landscape to portrait is detected 2110 then the surround sound track 2501 output track ends. Furthermore when the event of orientation change from landscape to portrait is detected 2110 then the stereo track 2503 continues but a new microphone configuration is selected (shown by event 2512) and a second portrait stereo microphone configuration is used as shown by configuration 2513.

In some embodiments where surround sound cannot be recorded or captured after the apparatus orientation has changed the device can be configured to, as shown in FIG. 22, end the surround sound track. In some embodiments such as shown in FIG. 23 the surround sound track can be 'simulated' by recording a mono or stereo and generating an output multichannel format upmixed from the mono or stereo source, for example a 5.1 channel output format generated from an upmixed mono or stereo recorded signal. In some embodiments the surround sound track output can be generated by recording or capture a stereo track and outputing the two channels as the front channels of the multichannel system, for example recording stereo channels and using these as the 5.1 track front channels. Similarly in some embodiments the surround sound track output can be generated by recording or capture a mono track and outputing the single channel as the centre channel of the multichannel system, for example recording a mono channel and using this as the 5.1 centre channel. In some embodiments the surround sound track output can be generated by not recording or recording silence and outputting the silence as the multichannel output, for example outputing 5.1 channels of no signal or silence.

Thus orientation change operations can be summarised as where the device orientation changes when audio is being recorded and the microphone locations in the new orientation do not support all the channel configurations supported in the previous orientation, then the apparatus can be configured to perform: ending the previous audio track(s) and start new one(s) with the new channel configuration(s); or continuing the previous audio track(s) when applicable and upmixing from the reduced input channels; or continuing the previous audio track(s) when applicable and changing the microphones to be used for those track(s); or any combination of the three options.

Furthermore it would be understood that in some embodiments that any and difference options can be applied individually for each track. In other words there may be a different options available for each track.

It shall be appreciated that the electronic device 10 may be any device incorporating an audio recordal system for example a type of wireless user equipment, such as mobile telephones, portable data processing devices or portable web browsers, as well as wearable devices.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
providing a device having a microphone configuration, wherein the microphone configuration comprises at least two microphones located relative to each other with respect to the device;
providing a plurality of recording modes, wherein a respective recording mode utilizes at least one microphone of the at least two microphones;
determining an orientation of the device, wherein the device is configured to be used in at least a landscape orientation, or a portrait orientation;
determining a recording mode from the plurality of recording modes;
utilizing the at least one microphone of the at least two microphones according to the recording mode and the determined orientation; and
processing at least one microphone signal from the utilized at least one microphone.

2. The method as claimed in claim 1, further comprising:
outputting, to a computer interface, a user interface that is configured to enable selection of the recording mode from the plurality of recording modes comprising surround sound recording, stereo recording mode, or mono recording mode.

3. The method as claimed in claim 1, further comprising:
determining a change to the orientation of the device;
determining that the at least one microphone of the device is unsupported for use according to the determined change to the orientation of the device; and
responsive to the determined unsupported use, configuring at least one audio track with another microphone configuration based on the determined change to the orientation of the device.

4. The method as claimed in claim 1, wherein determining the recording mode comprises:
providing a surround sound recording mode responsive to determining the landscape orientation of the device; and
providing a stereo sound recording mode responsive to determining the portrait orientation of the device.

5. The method as claimed in claim 1, wherein determining the recording mode comprises:
providing a stereo sound recording mode, wherein utilizing the at least one microphone comprises utilizing at least two microphones in the stereo sound recording mode responsive to determining the landscape orientation of the device; and
providing a mono sound recording mode utilizing the at least one microphone of the at least two microphones responsive to determining the portrait orientation of the device.

6. The method as claimed in claim 1, wherein utilizing the at least one microphone comprises:

responsive to determining the orientation of the device, enabling selection of the at least one microphone of the at least two microphones based on the determined orientation of the device.

7. The method as claimed in claim 1, wherein utilizing the at least one microphone comprises:
enabling selection of the at least one microphone of the at least two microphones according to a priority determination which assigns priority selection of the at least two microphones according to the recording mode and the determined orientation.

8. An apparatus comprising at least one processor and at least one memory including computer code for one or more programs, the at least one memory and the computer code configured with the at least one processor to cause the apparatus to at least:
determine an orientation of a device having a microphone configuration comprising at least two microphones located relative to each other with respect to the device, wherein the device is configured to be used in at least a landscape orientation, or a portrait orientation;
determine a recording mode from among a plurality of recording modes, wherein a respective recording mode of the plurality of recording modes utilizes at least one microphone of the at least two microphones;
utilize the at least one microphone of the at least two microphones according to the determined recording mode and the determined orientation; and
process at least one microphone signal from the utilized at least one microphone.

9. The apparatus as claimed in claim 8, wherein the at least one memory and the computer code are further configured to with the at least one processor cause the apparatus to at least:
output, to a computer interface, a user interface that is configured to enable selection of the recording mode from the plurality of recording modes comprising surround sound recording, stereo recording mode, or mono recording mode.

10. The apparatus as claimed in claim 8, wherein the at least one memory and the computer code are further configured to with the at least one processor cause the apparatus to at least:
determine a change to the orientation of the device;
determine that the at least one microphone of the device is unsupported for use according to the determined change to the orientation of the device; and
responsive to the determined unsupported use, configure at least one audio track with another microphone configuration based on the determined change to the orientation of the device.

11. The apparatus as claimed in claim 8, wherein the at least one memory and the computer code are further configured to with the at least one processor cause the apparatus to determine the recording mode by:
providing a surround sound recording mode responsive to determining the landscape orientation of the device; and
providing a stereo sound recording mode responsive to determining the portrait orientation of the device.

12. The apparatus as claimed in claim 8, wherein the at least one memory and the computer code are further configured to with the at least one processor cause the apparatus to determine the recording mode by:
providing a stereo sound recording mode, wherein utilizing the at least one microphone comprises utilizing at least two microphones in the stereo sound recording mode responsive to determining the landscape orientation of the device; and
providing a mono sound recording mode utilizing the at least one microphone of the at least two microphones responsive to determining the portrait orientation of the device.

13. The apparatus as claimed in claim 8, wherein the at least one memory and the computer code are further configured to with the at least one processor cause the apparatus to utilize the at least one microphone by:
responsive to determining an orientation of the device, enabling selection of the at least one microphone of the at least two microphones based on the determined orientation of the device.

14. The apparatus as claimed in claim 8, wherein the at least one memory and the computer code are further configured to with the at least one processor cause the apparatus to utilize the at least one microphone by:
enabling selection of the at least one microphone of the at least two microphones according to a priority determination which assigns priority selection of the at least two microphones according to the recording mode and the determined orientation.

15. A computer program product comprising at least one non-transitory computer readable storage medium having computer-executable program code stored therein, the computer-executable program code configured to:
determine an orientation of a device having a microphone configuration comprising at least two microphones located relative to each other with respect to the device, wherein the device is configured to be used in at least a landscape orientation or a portrait orientation;
determine a recording mode from among a plurality of recording modes, wherein a respective recording mode utilizes at least one microphone of the at least two microphones;
utilize the at least one microphone of the at least two microphones according to the determined recording mode and the determined orientation; and
process at least one microphone signal from the utilized at least one microphone.

16. The method as claimed in claim 1, wherein processing the at least one microphone signal comprises performing audio signal processing on the at least one microphone signal based on the orientation of the device.

17. The method as claimed in claim 16, wherein performing audio signal processing comprises at least one of: noise cancellation, beamforming, filtering, equalizing, attenuating, amplifying, switching or mixing.

18. The method as claimed in claim 16, wherein the microphone configuration changes responsive to determining the orientation of the device, and wherein performing audio signal processing comprises selecting the at least one microphone signal of the microphone configuration for processing depending on determining the orientation of the device.

19. The method as claimed in claim 1, further comprising determining the microphone configuration based on at least one of: the recording mode or the orientation of the device.

20. The method as claimed in claim 1, further comprising providing a user interface output indicating at least one of:
the determined recording mode for use;
parameters being used with the determined recording mode; or
which of the at least two microphones is the at least one microphone being used.

21. The method as claimed in claim 1, wherein the determined recording mode is a preferred recording mode based on the orientation of the device, and wherein the preferred recording mode is configured to be modified based on a user interface input.

22. The method as claimed in claim 1, wherein the plurality of recording modes comprises at least two recording modes, wherein the respective recording mode utilizes two or more microphones of the at least two microphones.

23. The method as claimed in claim 1, wherein the device is configured to be used further in at least one of: a reverse landscape orientation or a reverse portrait orientation.

24. The method as claimed in claim 23, wherein at least two microphones are utilized in each orientation.

25. The method as claimed in claim 1, wherein determining the orientation of the device comprises determining an orientation difference of the device with a range of orientation.

26. The method as claimed in claim 1, wherein each recoding mode utilizes at least one microphone of the at least two microphones.

27. The apparatus as claimed in claim 8, wherein the at least one memory and the computer code are further configured to with the at least one processor cause the apparatus to process the at least one microphone signal by performing audio signal processing on the at least one microphone signal based on the orientation of the device.

28. The apparatus as claimed in claim 27, wherein the at least one memory and the computer code are further configured to with the at least one processor cause the apparatus to perform audio signal processing by at least one of: noise cancellation, beamforming, filtering, equalizing, attenuating, amplifying, switching or mixing.

29. The apparatus as claimed in claim 27, wherein the microphone configuration changes responsive to determining the orientation of the device, and wherein the at least one memory and the computer code are further configured to with the at least one processor cause the apparatus to perform audio signal processing by selecting the at least one microphone signal of the microphone configuration for processing depending on determining the orientation of the device.

30. The apparatus as claimed in claim 8, wherein the at least one memory and the computer code are further configured to with the at least one processor cause the apparatus to determine the microphone configuration based on at least one of: the recording mode or the orientation of the device.

31. The apparatus as claimed in claim 8, wherein the at least one memory and the computer code are further configured to with the at least one processor cause the apparatus to provide a user interface output indicating at least one of:
the determined recording mode for use;
parameters being used with the determined recording mode; or
which of the at least two microphones is the at least one microphone being used.

32. The apparatus as claimed in claim 8, wherein the determined recording mode is a preferred recording mode based on the orientation of the device, and wherein the preferred recording mode is configured to be modified based on a user interface input.

33. The apparatus as claimed in claim 8, wherein the plurality of recording modes comprises at least two recording modes, wherein the respective recording mode utilizes two or more microphones of the at least two microphones.

34. The apparatus as claimed in claim 8, wherein the device is configured to be used further in at least one of: a reverse landscape orientation or a reverse portrait orientation.

35. The apparatus as claimed in claim 34, wherein at least two microphones are utilized in each orientation.

36. The apparatus as claimed in claim 8, wherein the at least one memory and the computer code are further configured to with the at least one processor cause the apparatus to determine the orientation of the device by determining an orientation difference of the device with a range of orientation.

37. The apparatus as claimed in claim 8, wherein each recoding mode utilizes at least one microphone of the at least two microphones.

* * * * *

UNITED STATES PATENT AND TRADEMARK OFFICE
CERTIFICATE OF CORRECTION

| | |
|---|---|
| PATENT NO. | : 11,847,376 B2 |
| APPLICATION NO. | : 17/515359 |
| DATED | : December 19, 2023 |
| INVENTOR(S) | : Marko Tapani Yliaho et al. |

It is certified that error appears in the above-identified patent and that said Letters Patent is hereby corrected as shown below:

On the Title Page

In Column 1, item (72), Inventors, Line 2, delete "Lempaala" and insert -- Lempäälä --, therefor.

In Column 2, item (57), ABSTRACT, Line 12, delete "in" and insert -- on --, therefor.

In the Claims

In Column 32, Line 28, Claim 1, delete "the recording" and insert -- the determined recording --, therefor.

In Column 35, Line 20, Claim 26, delete "recoding" and insert -- recording --, therefor.

In Column 36, Line 40, Claim 37, delete "recoding" and insert -- recording --, therefor.

Signed and Sealed this
Twelfth Day of March, 2024

*Katherine Kelly Vidal*
Katherine Kelly Vidal
*Director of the United States Patent and Trademark Office*